(12) United States Patent
Teruyama

(10) Patent No.: US 8,457,024 B2
(45) Date of Patent: Jun. 4, 2013

(54) INFORMATION PROCESSING DEVICE AND PROGRAM

(75) Inventor: Katsuyuki Teruyama, Tokyo (JP)

(73) Assignee: Sony Corporation, Tokyo (JP)

( * ) Notice: Subject to any disclaimer, the term of this patent is extended or adjusted under 35 U.S.C. 154(b) by 286 days.

(21) Appl. No.: 12/851,858

(22) Filed: Aug. 6, 2010

(65) Prior Publication Data

US 2011/0053501 A1 Mar. 3, 2011

(30) Foreign Application Priority Data

Aug. 26, 2009 (JP) ................................. 2009-195899

(51) Int. Cl.
*H04L 5/14* (2006.01)
*H04L 12/43* (2006.01)

(52) U.S. Cl.
USPC .......................................... 370/294; 370/458

(58) Field of Classification Search
USPC ................. 370/201, 252, 254, 280, 294, 336, 370/345, 442, 443, 458
See application file for complete search history.

(56) References Cited

U.S. PATENT DOCUMENTS

| 6,980,699 | B1 | 12/2005 | Okada | |
|---|---|---|---|---|
| 7,817,573 | B2* | 10/2010 | Koezuka | 370/252 |
| 8,008,799 | B2* | 8/2011 | Rofougaran | 307/3 |
| 2006/0245402 | A1* | 11/2006 | Fujii et al. | 370/338 |
| 2008/0084860 | A1* | 4/2008 | Bloebaum et al. | 370/342 |
| 2009/0218657 | A1* | 9/2009 | Rofougaran | 257/531 |
| 2010/0148931 | A1* | 6/2010 | Pappu et al. | 340/10.2 |

FOREIGN PATENT DOCUMENTS

| JP | 2001-28682 | 1/2001 |
|---|---|---|
| JP | 2009-147845 | 7/2009 |

OTHER PUBLICATIONS

Japanese Office Action mailed Apr. 16, 2013, in Japanese Patent Application No. 2009-195899.

* cited by examiner

*Primary Examiner* — Hong Cho
(74) *Attorney, Agent, or Firm* — Oblon, Spivak, McClelland, Maier & Neustadt, L.L.P.

(57) ABSTRACT

An information processing device includes a plurality of elements that perform processing independently of each other; and a front end that controls the plurality of elements, is shared by the plurality of elements, and performs near-field communication with an external device. The front end gives different time slots for communication to the plurality of elements at the time of activation.

9 Claims, 18 Drawing Sheets

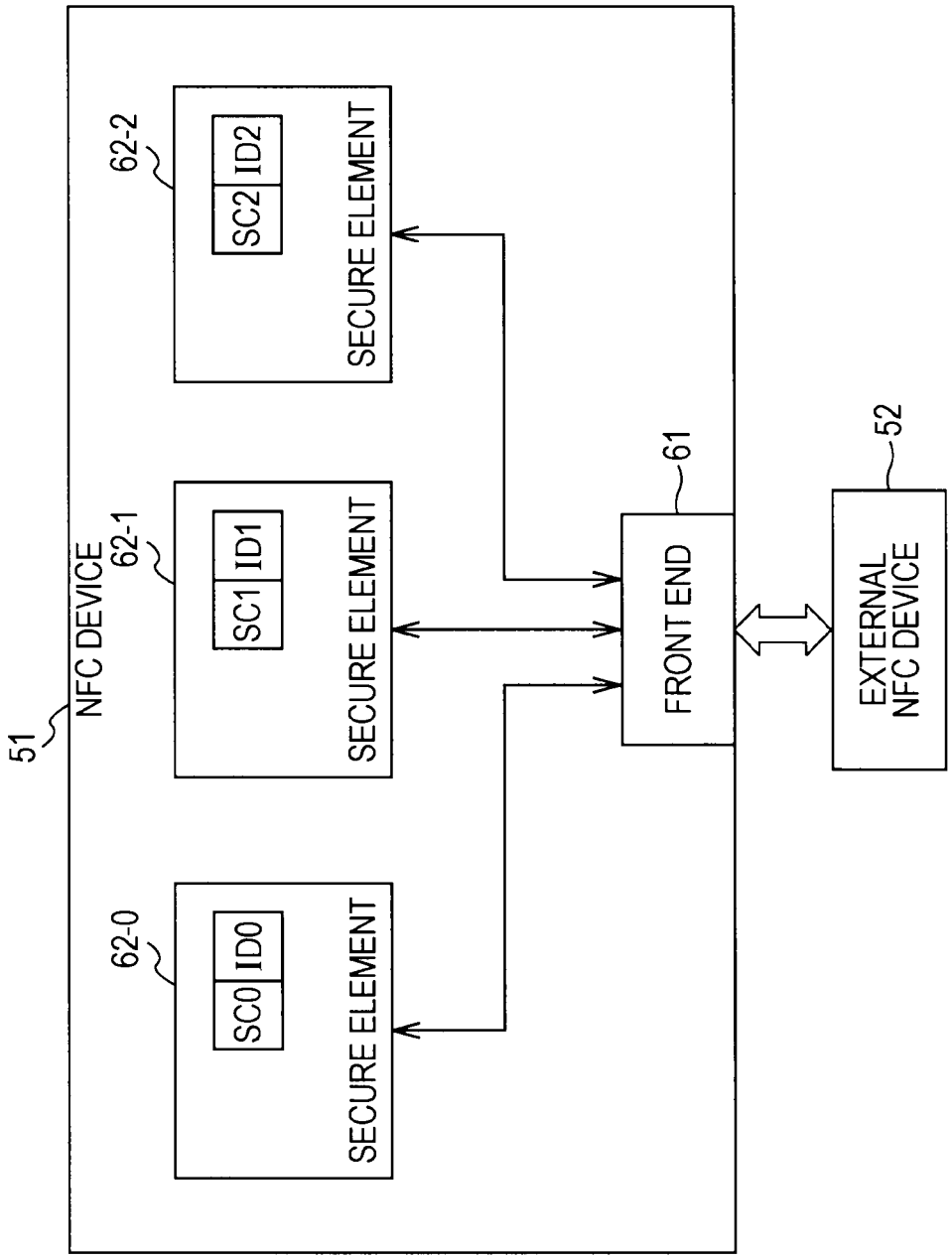

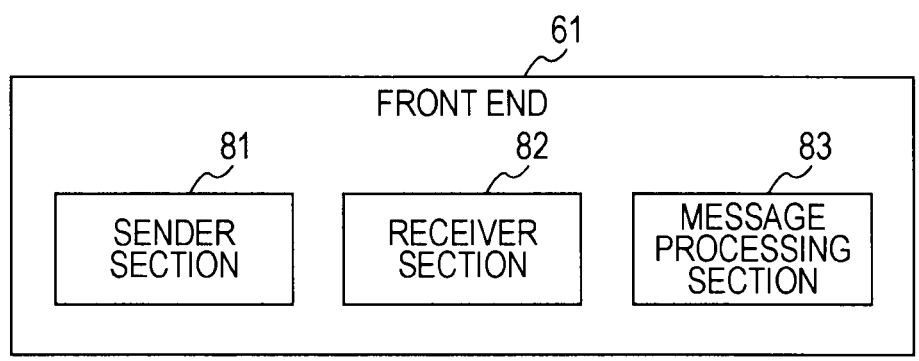
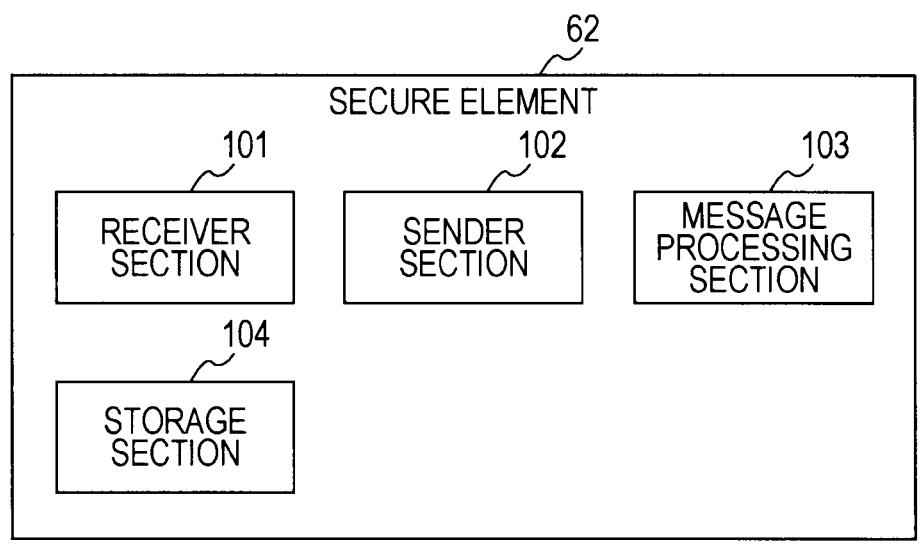

FIG. 4

| SET TIME-SLOT REQUEST CODE | IDENTIFICATION NUMBER | TIME SLOT |

| SET TIME-SLOT RESPONSE CODE | IDENTIFICATION NUMBER | STATUS |

FIG. 5

| POLLING REQUEST CODE | SYSTEM CODE | REQUEST CODE | TIME SLOT |

| POLLING RESPONSE CODE | IDENTIFICATION NUMBER | ADDITIONAL INFORMATION |

FIG. 6
FIG. 7

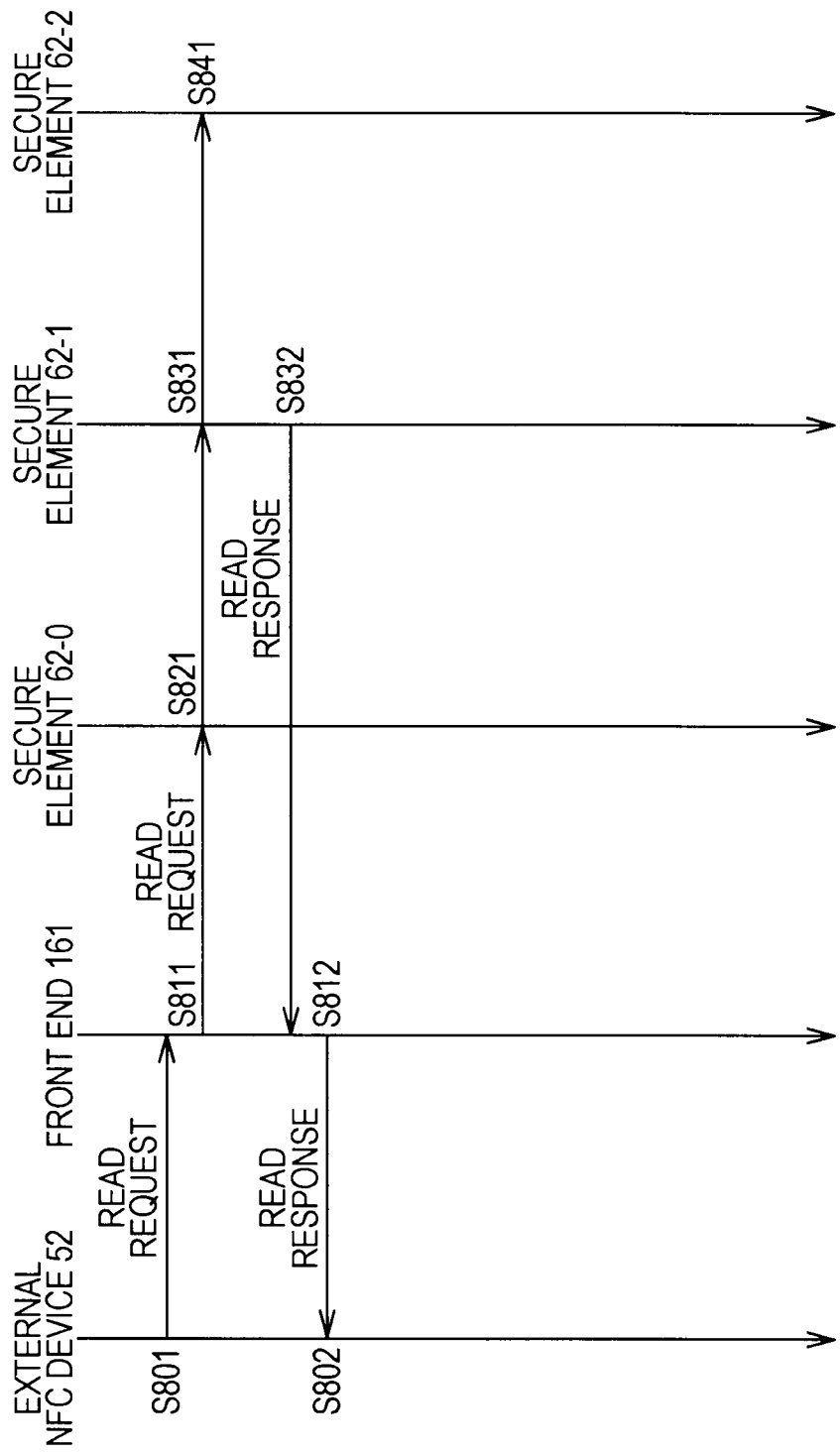

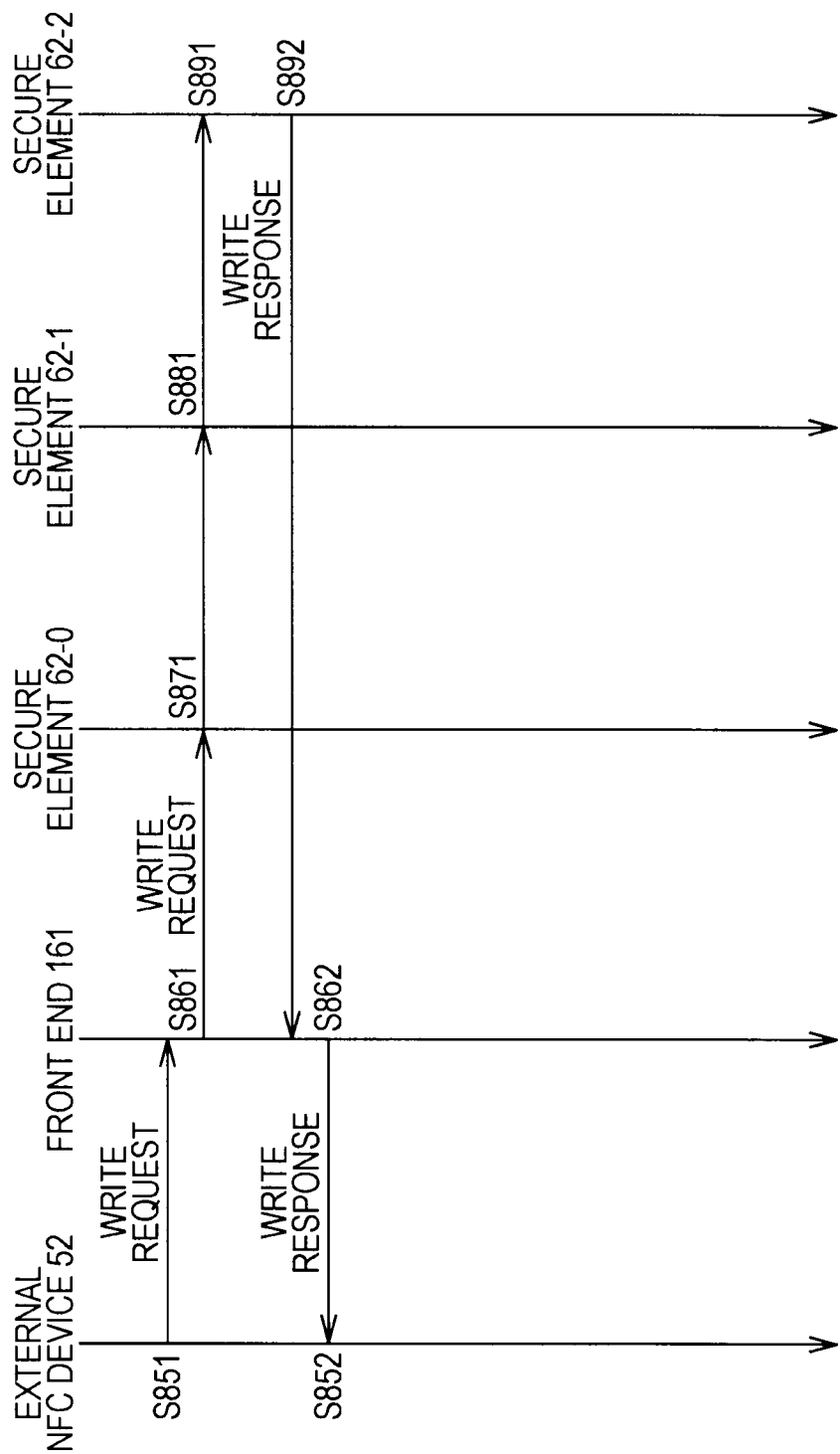

INFORMATION PROCESSING DEVICE AND PROGRAM

BACKGROUND OF THE INVENTION

1. Field of the Invention

The present invention relates to information processing devices and programs, and particularly, to an information processing device and a program that establish communication in a shorter time.

2. Description of the Related Art

A technology related to near-field communication (NFC) based on electromagnetic induction utilizing a single-frequency carrier has been previously proposed by the present applicant (for example, see Japanese Unexamined Patent Application Publication No. 2001-28682). When utilizing a single-frequency carrier, if multiple devices are to communicate with a single device at the same time, a collision occurs, making it difficult for the single device to effectively receive signals from the other devices. In light of this, in the aforementioned proposition, each device is configured to generate a radio-frequency (RF) field after confirming that there are no RF fields of the other devices.

When a device (e.g., device A) performs near-field communication with another device (e.g., device B), multiple independent devices (e.g., device a, device b, and device c) are sometimes accommodated within the device A and are wire-connected to each other. In this case, the device A is only capable of generating a single RF field. Specifically, the devices a, b, and c share a communication section for RF-field-based communication with the other device B, such that only one of the devices a, b, and c, as the device A, can perform near-field communication with the other device B.

SUMMARY OF THE INVENTION

During activation of the device A, it is necessary to establish communication between the communication section and the devices a, b, and c. However, in actuality, a controller that controls the devices a, b, and c sends a polling message thereto via the communication section and subsequently sets the time slots of the devices a, b, and c. Therefore, communication is performed between the controller and the communication section in addition to the communication between the communication section and the devices a, b, and c, thus resulting in an excessive time for establishing the communication at the time of activation of the device A.

It is therefore desirable to establish communication in a shorter time at the time of activation.

According to an embodiment of the present invention, there is provided an information processing device that includes a plurality of elements that perform processing independently of each other; and a front end that controls the plurality of elements, is shared by the plurality of elements, and performs near-field communication with an external device. The front end gives different time slots for communication to the plurality of elements at the time of activation.

The time of activation may include when power is supplied, when the element is removed, or when the element is added.

The time slots given to the elements by the front end may correspond to timings according to the order in which the elements are electrically connected.

The plurality of elements may include a detachable element and a fixed element. In this case, the fixed element may store the given time slot in a nonvolatile manner, and the detachable element may store the time slot in a volatile manner.

The time slot given to the fixed element by the front end may correspond to an earliest timing, and the time slot given to the detachable element by the front end may correspond to a timing later than that for the fixed element.

The front end may send a polling request to the plurality of elements in the order in which the elements are electrically connected, acquire and store identification information for identifying each element, the identification information being included in a response to the request from each element, and give the elements the time slots corresponding to timings according to the order in which the identification information is acquired therefrom.

When the front end receives a polling request from the external device towards the plurality of elements, the front end may send a response for each element to the external device in accordance with the time slot given to the element, the response including the stored identification information of the element.

Every time the front end receives a polling request from the external device towards the plurality of elements, the front end may change the time slot given to each element and send a response for each element to the external device in accordance with the changed time slot of the element, the response including the stored identification information of the element.

The front end may store identification information of the fixed element of the plurality of elements in advance and give a time slot corresponding to a predetermined timing to the fixed element. In this case, when the front end receives a polling request from the external device towards the plurality of elements, the front end may send a response for the fixed element to the external device in accordance with the time slot corresponding to the predetermined timing, the response including the stored identification information.

The time slot of the fixed element may be given thereto in advance at the time of manufacture. In this case, when the front end receives the polling request from the external device towards the plurality of elements, the front end may send a response for the fixed element to the external device in accordance with the time slot given in advance at the time of manufacture, the response including the stored identification information.

The fixed element can function as a controller that controls the other element.

According to another embodiment of the present invention, there is provided a program of an information processing device that includes a plurality of elements that perform processing independently of each other; and a front end that controls the plurality of elements, is shared by the plurality of elements, and performs near-field communication with an external device. The program makes a computer execute a process in which the front end gives different time slots for communication to the plurality of elements at the time of activation.

According to another embodiment of the present invention, there is provided a storage medium that stores a program of an information processing device that includes a plurality of elements that perform processing independently of each other; and a front end that controls the plurality of elements, is shared by the plurality of elements, and performs near-field communication with an external device. The program makes a computer execute a process in which the front end gives different time slots for communication to the plurality of elements at the time of activation.

According to the embodiments of the present invention, communication can be established in a shorter time at the time of activation.

BRIEF DESCRIPTION OF THE DRAWINGS

FIG. 1 is a block diagram illustrating the configuration of an NFC communication system according to an embodiment of the present invention;

FIG. 2 is a block diagram illustrating a functional configuration of a front end according to an embodiment;

FIG. 3 is a block diagram illustrating a functional configuration of a secure element according to an embodiment;

FIG. 4 illustrates packet structures of set time-slot request/response messages;

FIG. 5 illustrates packet structures of polling request/response messages;

FIG. 6 illustrates packet structures of read request/response messages;

FIG. 7 illustrates packet structures of write request/response messages;

FIG. 20 is a diagram for explaining a process performed when reading data from the NFC device; and FIG. 21 is a diagram for explaining a process performed when writing data into the NFC device.

DESCRIPTION OF THE PREFERRED EMBODIMENTS

Figure 8:
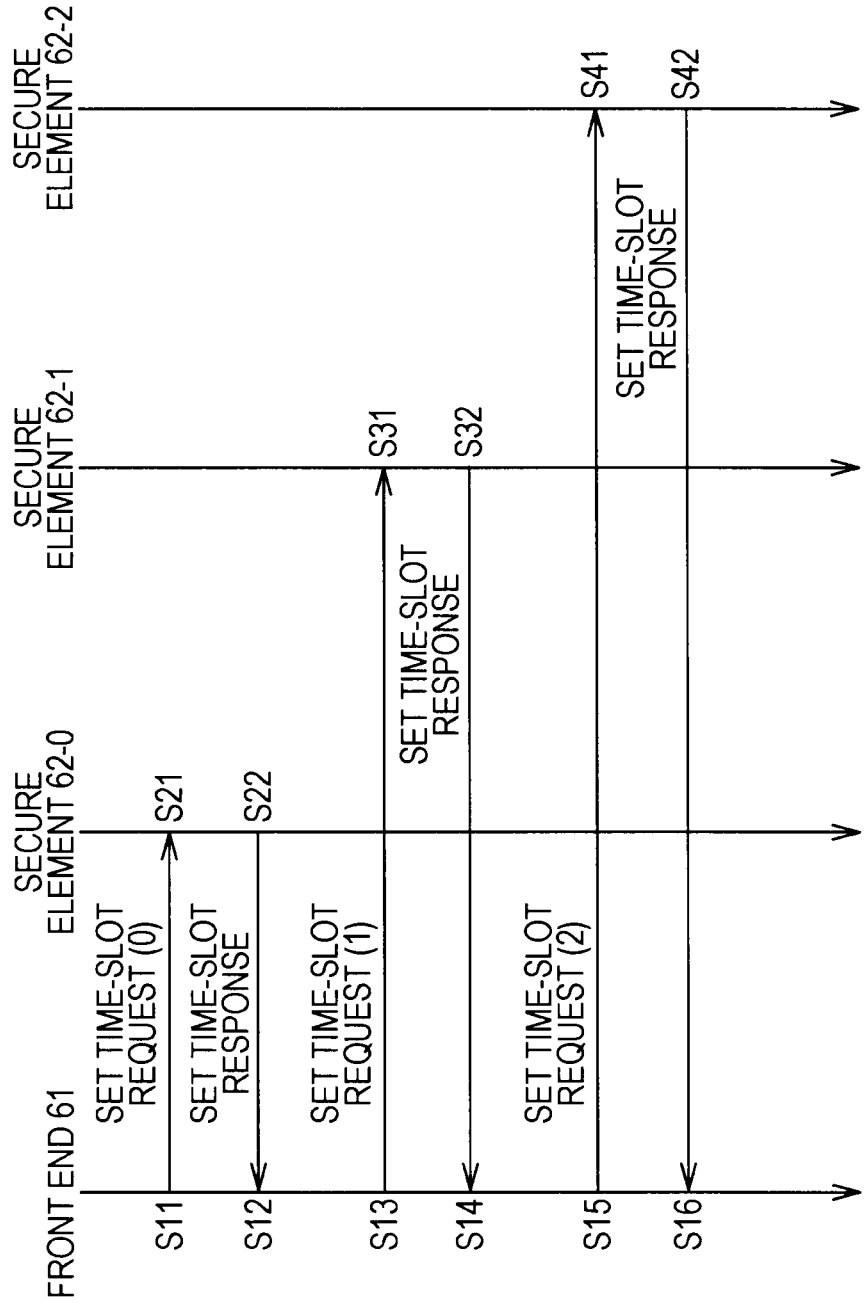
FIG. 8 is a diagram for explaining a time-slot setting process performed at the time of activation.

Embodiments of the present invention will be described below with reference to the drawings.
Configuration of NFC Communication System FIG. 1 illustrates the configuration of an NFC communication system according to an embodiment of the present invention. In this embodiment, the NFC communication system includes an NFC device 51 and an external NFC device 52.

The NFC device 51 mainly includes a portable device, such as an IC (integrated circuit) card, a portable telephone, a PDA (personal digital assistant), a wristwatch, a pen, and a personal computer, whereas the external NFC device 52 includes, but not limited to, a reader-writer. These devices perform near-field communication within a distance range of several tens of centimeters (including when the devices are in contact with each other) by using a carrier with a frequency of 13.56 MHz in the ISM (industrial scientific medical) band.

The NFC device 51 has a single housing that accommodates a front end 61 and secure elements 62-0, 62-1, and 62-2. The secure element 62-0 is installed and fixed in the NFC device 51 in advance at the time of manufacture thereof. In contrast, the secure elements 62-1 and 62-2 are attached or detached, where appropriate, by an administrator of the NFC device 51 (i.e., one who provides the NFC device 51 to a user). As shown in FIG. 1, the front end 61 and the secure elements 62-0, 62-1, and 62-2 are connected (star-connected) to each other via wires, such as cords, but can also be connected (bus-connected) to each other via, for example, a bus.

The front end 61 controls the operation of the secure elements 62-0, 62-1, and 62-2 (sometimes simply referred to as "secure elements 62" if it is not necessary to differentiate between these elements). In particular, the front end 61 gives a time slot for communication to the secure element 62-0 at the time of manufacture, and also gives different time slots for communication to the secure elements 62-0, 62-1, and 62-2 at the time of activation. The expression "at the time of activation" includes when power is supplied, when the secure elements 62 are removed, or when the secure elements 62 are added.

The front end 61 of the NFC device 51 performs near-field communication with the external NFC device 52. Specifically, the front end 61 is shared by the secure elements 62-0, 62-1, and 62-2 and has a function of performing near-field communication with the external NFC device 52. Therefore, the front end 61 supplies a signal from the external NFC device 52 to the secure elements 62-0, 62-1, and 62-2. A signal from any one of the secure elements 62-0, 62-1, and 62-2 is supplied to the remaining two secure elements and to the external NFC device 52. The signals are exchanged in units of packets.

The secure elements 62-0, 62-1, and 62-2 operate through different applications and securely perform processing independently of each other. Each application is given a system code as identification information for identifying the corresponding secure element 62. For example, the secure element 62-0 may function as a train pass that is given a system code SC0, the secure element 62-1 may function as a prepaid card that is given a system code SC1 and to be used for payment at affiliated stores, and the secure element 62-2 may function as an ID (identification) card that is given a system code SC2 and to be used at a user's workplace. For example, when the NFC device 51 is brought near or into contact with the external NFC device 52 that operates through an application with a predetermined system code, one of the secure elements 62 that corresponds to the aforementioned application with the system code communicates with the external NFC device 52.

The secure elements 62-0, 62-1, and 62-2 are respectively given identification numbers ID0, ID1, and ID2 as identification information for identifying the respective secure elements.

An administrator of each application knows the system code of the application that the administrator administers, but does not know the system codes of the applications administered by other administrators. Each secure element 62 confirms the existence of the other secure elements 62 with the corresponding applications by designating the system codes thereof, and acquires the individual IDs of the confirmed secure elements 62 so as to communicate with the individual secure elements 62 on the basis of the IDs.

The secure element 62-0 can also function as a baseband controller that controls each secure element in an NFC device of the related art. Specifically, the secure element 62-0 may be configured to control the operation of the other secure elements 62.

FIG. 2 illustrates a functional configuration of the front end 61 according to an embodiment. The front end 61 includes a sender section 81, a receiver section 82, and a message processing section 83.

The sender section 81 sends a signal to the external NFC device 52 or the secure elements 62, whereas the receiver section 82 receives a signal from the external NFC device 52 or the secure elements 62. The message processing section 83 performs processing in accordance with various kinds of messages as sent/received signals.

FIG. 3 illustrates a functional configuration of each secure element 62 according to an embodiment. Each secure element 62 includes a receiver section 101, a sender section 102, a message processing section 103, and a storage section 104.

The receiver section 101 receives a signal from the front end 61. The sender section 102 sends a signal to the front end 61. The sender section 102 has a function of performing communication in a time slot of a random timing until the sender section 102 is given a specific time slot. The message processing section 103 performs processing in accordance with various kinds of messages as sent/received signals.

The storage section 104 stores, in a nonvolatile manner, the system codes of the applications as well as the identification numbers as identification information for identifying the secure elements 62. Of the secure elements 62, the secure element 62-0 installed and fixed in the NFC device 51 in advance at the time of manufacture stores a set time-slot number in a nonvolatile manner. The secure elements 62-1 and 62-2 to be installed after manufacture store set time-slot numbers in a volatile manner.

Next, packet structures of messages used in the NFC communication system in FIG. 1 will be described with reference to FIGS. 4 to 7.

FIG. 4 illustrates packet structures of set time-slot request/response messages. The set time-slot request/response messages are to be used when setting or changing the time-slot number stored in each secure element 62. As shown in the upper part of FIG. 4, a set time-slot request message includes a set time-slot request code, an identification number, and a time slot (time-slot number). Furthermore, as shown in the lower part of FIG. 4, a set time-slot response message includes a set time-slot response code, an identification number, and a status of the corresponding secure element 62.

The secure element 62 receives the set time-slot request message, resets the time-slot number if the identification number included in the set time-slot request message matches the identification number stored in the secure element 62, and responds with the set time-slot response message.

FIG. 5 illustrates packet structures of polling request/response messages. The polling request/response messages are to be used when the external NFC device 52 captures one of the secure elements 62 as a communication partner. As shown in the upper part of FIG. 5, a polling request message includes a polling request code, a system code, a request code, and a time slot (time-slot number). The system code has an application number of the secure element 62 written therein. When the NFC device 51 receives the polling request message from the external NFC device 52, the secure element 62 having the application that corresponds to the application number written in this system code responds with a polling response message. However, if FFFFh is written in this system code, all of the secure elements 62 that have received the polling request message respond with the polling response message.

The time slot has one of time-slot numbers from, for example, 0 to 15 written therein. The secure element 62 having received the polling request message responds with the polling response message at a timing corresponding to a time-slot number that is smaller than or equal to a value written in the time slot. For example, if a maximum value of 15 is written as a time-slot number, the secure element 62 having received the polling request message responds with the polling response message at a timing corresponding to a time-slot number of a value that is freely chosen from 0 to 15. In this case, the NFC device 51 can respond with a maximum of 16 polling response messages. In other words, the value written in the time slot determines the maximum value of time-slot numbers set in the NFC device 51. More specifically, if "0" is written in the time slot of the polling request message, the NFC device 51 can respond with a maximum of one polling response message, or if "1" is written in the time slot, the NFC device 51 can respond with a maximum of two polling response messages. Furthermore, if "3" is written in the time slot of the polling request message, the NFC device 51 can respond with a maximum of four polling response messages, or if "7" is written in the time slot, the NFC device 51 can respond with a maximum of eight polling response messages. If "15" is written in the time slot, the NFC device 51 can respond with a maximum of 16 polling response messages. The request code is used where appropriate.

On the other hand, as shown in the lower part of FIG. 5, the polling response message includes a polling response code, an identification number, and additional information. The identification number includes an identification number of the secure element 62 that sends the polling response message as a response. The additional information includes predetermined data.

FIG. 6 illustrates packet structures of read request/response messages. The read request/response messages are to be used when the external NFC device 52 reads data stored in each secure element 62. As shown in the upper part of FIG. 6, a read request message includes a read request code, an identification number, and a parameter. On the other hand, as shown in the lower part of FIG. 6, a read response message includes a read response code, an identification number, and a parameter. Each parameter includes data to be read.

When the secure element 62 receives the read request message, the secure element 62 reads requested data if the identification number included in the read request message matches the identification number stored in the secure element 62, and sends the read response message.

FIG. 7 illustrates packet structures of write request/response messages. The write request/response messages are to be used when the external NFC device 52 writes data into each secure element 62. As shown in the upper part of FIG. 7, a write request message includes a write request code, an identification number, and a parameter. On the other hand, as shown in the lower part of FIG. 7, a write response message includes a write response code, an identification number, and a parameter. Each parameter includes data to be written.

When the secure element 62 receives the write request message, the secure element 62 writes requested data if the identification number included in the write request message matches the identification number stored in the secure element 62, and sends the write response message.

Time-Slot Setting Process at the Time of Activation

Next, a time-slot setting process performed at the time of activation of the NFC device 51 will be described with reference to FIG. 8.

Supposedly, the secure element 62-0 is installed in the NFC device 51 in advance at the time of manufacture thereof, whereas the secure elements 62-1 and 62-2 are sequentially installed in the NFC device 51 by the administrator of the NFC device 51. Specifically, the secure elements 62-0, 62-1, and 62-2 are installed in (electrically connected to) the NFC device 51 in that order, and the front end 61 knows the identification numbers of the individual secure elements 62, as well as the order in which the connection of the secure elements 62 is detected.

In step S11, the sender section 81 of the front end 61 sends a set time-slot request message to the secure element 62-0, the connection of which has been detected first and whose identification number is ID0. In this request message, a minimum value of "0" is set as a time-slot number by the message processing section 83.

In step S21, when the secure element 62-0 whose identification number is ID0 receives this request message via the receiver section 101 thereof, the storage section 104 stores the time-slot number "0" thereof in a nonvolatile manner. As a result, the secure element 62-0 subsequently performs communication at a timing corresponding to the stored time-slot number "0". Since this time-slot number "0" is a value indicating the earliest timing, the secure element 62-0 can perform communication by priority in terms of time, relative to the other secure elements 62.

In step S22, the sender section 102 of the secure element 62-0 sends a set time-slot response message to the front end 61, which is the original source of the request message. This response message is given "ID0" as the sender's identification number by the message processing section 103, as well as the set and stored time-slot number "0", as the status, for confirmation.

In step S12, the receiver section 82 of the front end 61 receives this response message so as to confirm that the time-slot number is stored in the secure element 62-0.

In step S13, the sender section 81 of the front end 61 sends a set time-slot request message to the secure element 62-1, the connection of which has been detected second and whose identification number is ID1. In this request message, a time-slot number "1" corresponding to the second-earliest timing after the minimum value "0" is set as a time-slot number by the message processing section 83.

In step S31, when the secure element 62-1 whose identification number is ID1 receives this request message via the receiver section 101 thereof, the storage section 104 stores the time-slot number "1" thereof in a volatile manner. As a result, the secure element 62-1 subsequently performs communication at a timing corresponding to the stored time-slot number "1".

In step S32, the sender section 102 of the secure element 62-1 sends a set time-slot response message to the front end 61, which is the original source of the request message. This response message is given "ID1" as the sender's identification number by the message processing section 103, as well as the set and stored time-slot number "1", as the status, for confirmation.

In step S14, the receiver section 82 of the front end 61 receives this response message so as to confirm that the time-slot number is stored in the secure element 62-1.

In step S15, the sender section 81 of the front end 61 sends a set time-slot request message to the secure element 62-2, the connection of which has been detected third and whose identification number is ID2. In this request message, a time-slot number "2" is set as a time-slot number by the message processing section 83.

In step S41, when the secure element 62-2 whose identification number is ID2 receives this request message via the receiver section 101 thereof, the storage section 104 stores the time-slot number "2" thereof in a volatile manner. As a result, the secure element 62-2 subsequently performs communication at a timing corresponding to the stored time-slot number "2".

In step S42, the sender section 102 of the secure element 62-2 sends a set time-slot response message to the front end 61, which is the original source of the request message. This response message is given "ID2" as the sender's identification number by the message processing section 103, as well as the set and stored time-slot number "2", as the status, for confirmation.

In step S16, the receiver section 82 of the front end 61 receives this response message so as to confirm that the time-slot number is stored in the secure element 62-2.

In this manner, the front end 61 sets the time slots of the secure elements 62 at the time of activation of the NFC device 51.

In the NFC device of the related art, at the time of activation thereof, a baseband controller that controls each secure element sends a polling message via a front end and subsequently sets the time slot of each secure element. This results in an excessive time for establishing communication at the time of activation. In contrast, with the above-described process, since the front end 61 simply sets the time slots of the timings in accordance with the order in which the connection of the secure elements 62 is detected, communication can be established in a shorter time at the time of activation of the NFC device 51.

Furthermore, since the secure elements do not generate RF fields independently, it is difficult to detect in advance whether an RF field is generated by one of the secure elements or by one of the remaining secure elements. For this reason, in the NFC device of the related art, when the secure elements try to communicate with the external NFC device 52 at the same time, a collision occurs.

Figure 9:
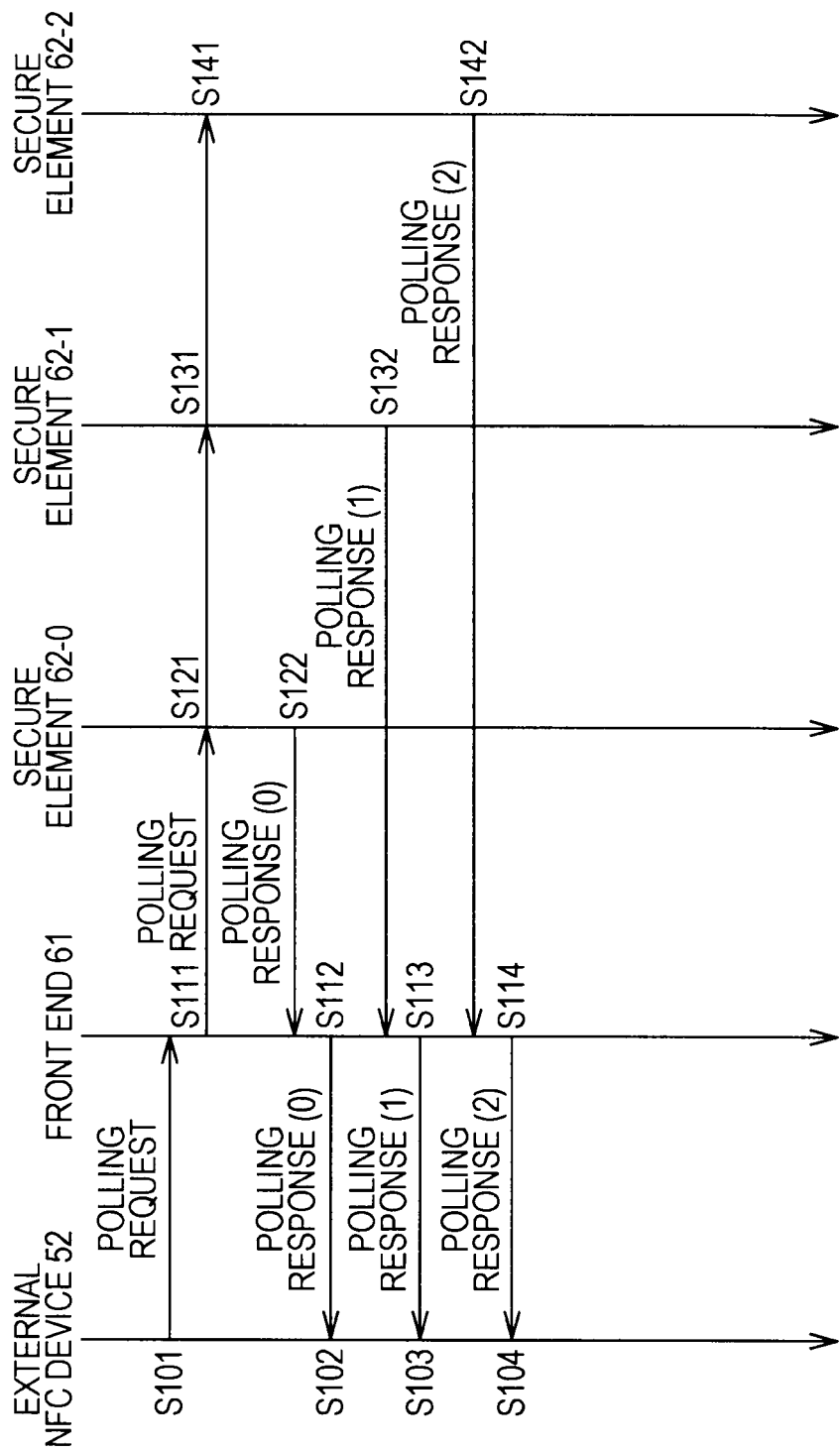
FIG. 9 is a diagram for explaining a process performed when an external NFC device performs polling.

In light of this, with the above-described process, since the time-slot numbers are set so as not to coincide with each other, a collision does not occur. For example, a process performed when the external NFC device 52 performs polling is as shown in FIG. 9.

Process Performed when External NFC Device Performs Polling

In step S101, the external NFC device 52 outputs a polling request message to the NFC device 51. In this case, the communication partner's system code is set as FFFFh, and the time-slot number is set to a maximum settable number Nmax.

In step S111, when the receiver section 82 of the front end 61 of the NFC device 51 receives this request message, the sender section 81 supplies the request message to each element in the NFC device 51. The receiver sections 101 of the secure elements 62-2, 62-1, and 62-0 receive this request message in steps S121, S131, and S141, respectively.

Each secure element 62 responds to this request message at a timing corresponding to the set time-slot number. Specifically, in step S122, the sender section 102 of the secure element 62-0 in which the time-slot number "0" corresponding to the earliest timing is set responds with a polling response message given its own identification number ID0 by the message processing section 103. In step S112, when the receiver section 82 of the front end 61 receives this response message, the sender section 81 supplies the response message to the external NFC device 52 and each secure element 62.

However, the process in which the polling response message is supplied from the front end 61 to each secure element 62 is not shown in FIG. 9.

In step S102, the external NFC device 52 receives this response message. Thus, the external NFC device 52 can confirm the identification number of the secure element 62-0. Although the receiver sections 101 of the secure elements 62-0, 62-1, and 62-2 each receive this response message, this will be disregarded since a request message is not output.

Next, in step S132, the sender section 102 of the secure element 62-1 in which the time-slot number "1" corresponding to the second-earliest timing is set responds with a polling response message given its own identification number ID1 by the message processing section 103. In step S113, when the receiver section 82 of the front end 61 receives this response message, the sender section 81 supplies the response message to the external NFC device 52 and each secure element 62. However, the process in which the polling response message is supplied from the front end 61 to each secure element 62 is not shown in FIG. 9.

In step S103, the external NFC device 52 receives this response message. Thus, the external NFC device 52 can confirm the identification number of the secure element 62-1. Although the receiver sections 101 of the secure elements 62-0, 62-1, and 62-2 each receive this response message, this will be disregarded since a request message is not output.

Furthermore, in step S142, the sender section 102 of the secure element 62-2 in which the time-slot number "2" corresponding to the latest timing is set responds with a polling response message given its own identification number ID2 by the message processing section 103. In step S114, when the receiver section 82 of the front end 61 receives this response message, the sender section 81 supplies the response message to the external NFC device 52 and each secure element 62. However, the process in which the polling response message is supplied from the front end 61 to each secure element 62 is not shown in FIG. 9.

In step S104, the external NFC device 52 receives this response message. Thus, the external NFC device 52 can confirm the identification number of the secure element 62-2. Although the receiver sections 101 of the secure elements 62-0, 62-1, and 62-2 each receive this response message, this will be disregarded since a request message is not output.

Accordingly, since the time-slot numbers are set so as not to coincide with each other, a collision does not occur even when the time given to the time slot of each number is short, thereby allowing for speedy communication.

In the above description, each of the secure elements 62 sends a response via the front end 61 when the external NFC device 52 performs polling on the NFC device 51. Alternatively, for example, the front end 61 may perform polling on the individual secure elements 62 in advance and store the responses thereof so that when the external NFC device 52 performs polling on the NFC device 51, the responses stored in the front end 61 can be sent to the external NFC device 52.

Alternative Configuration of NFC Communication System

Figure 10:
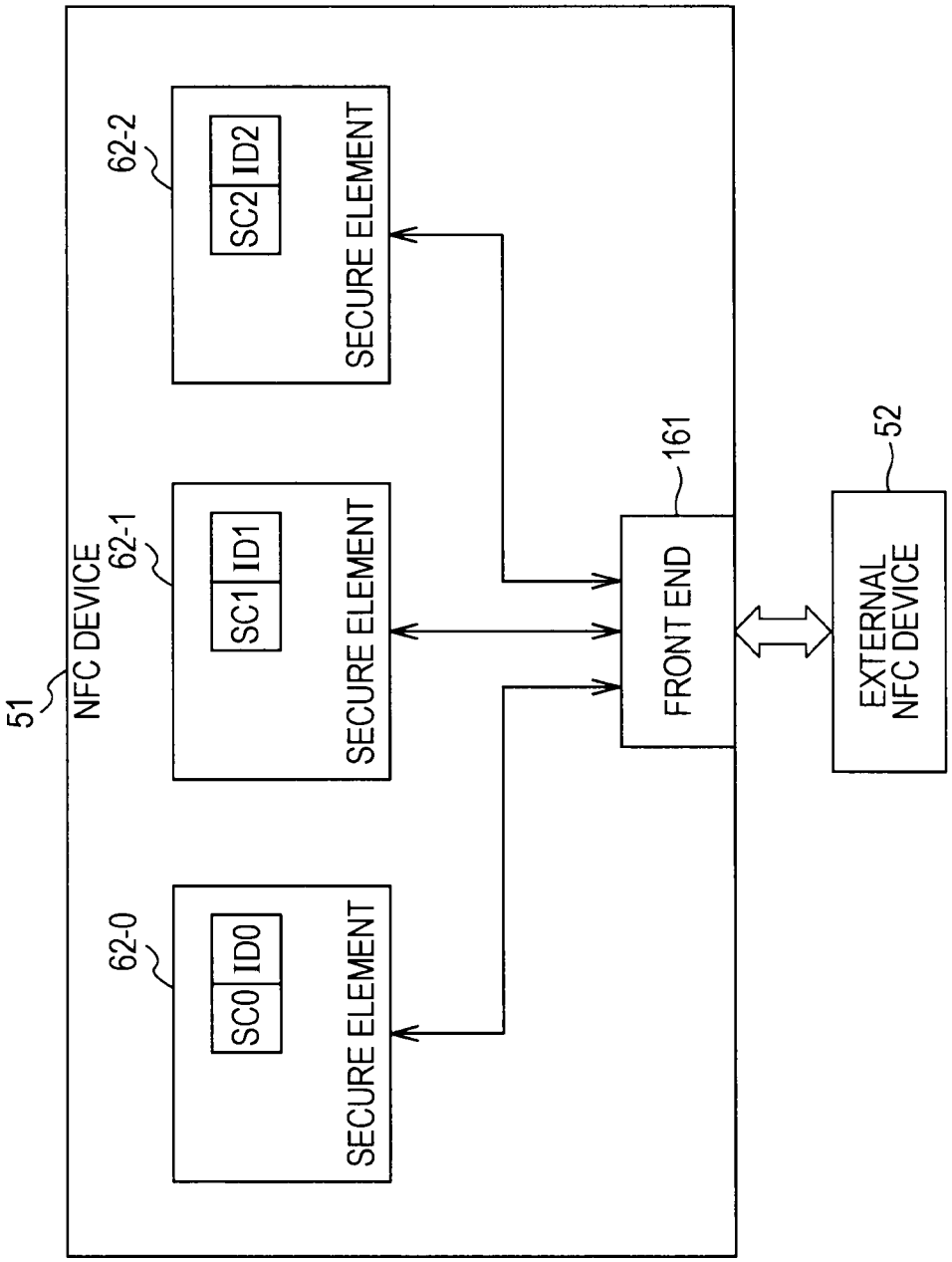
FIG. 10 is a block diagram illustrating the configuration of an NFC communication system according to another embodiment of the present invention.

FIG. 10 illustrates the configuration of an NFC communication system according to another embodiment of the present invention. In this embodiment, components having the same functions as those in the NFC communication system in FIG. 1 are given the same names and the same reference numerals, and descriptions thereof will not be repeated.

Specifically, the NFC communication system in FIG. 10 differs from the NFC communication system in FIG. 1 in that the NFC device 51 is provided with a front end 161 in place of the front end 61. As shown in FIG. 10, the front end 161 and the secure elements 62-0, 62-1, and 62-2 are connected (star-connected) to each other via wires, such as cords.

A configuration example of the front end 161 will be described here with reference to FIG. 11. In the front end 161 in FIG. 11, components having the same functions as those in the front end 61 in FIG. 2 are given the same names and the same reference numerals, and descriptions thereof will not be repeated.

Figure 11:
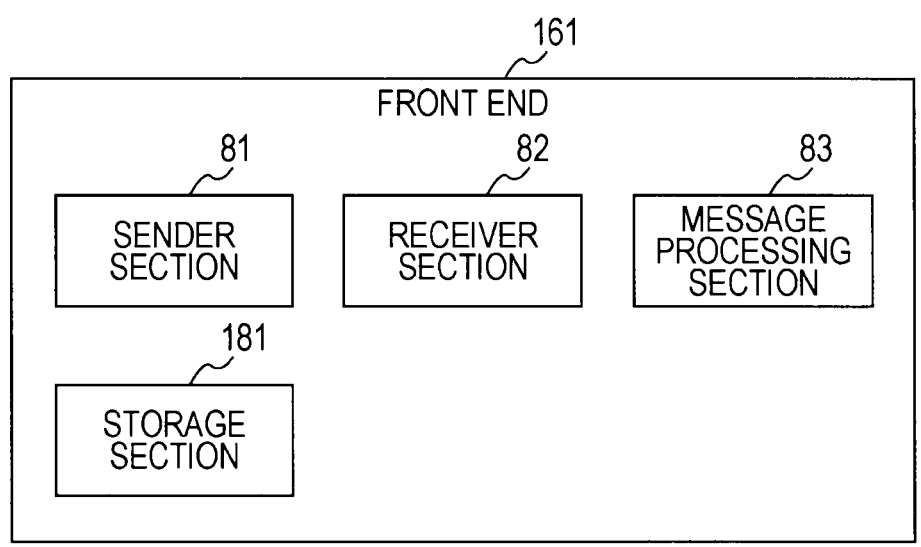
FIG. 11 is a block diagram illustrating a functional configuration of a front end according to another embodiment.

Specifically, the front end 161 in FIG. 11 differs from the front end 61 in FIG. 2 in being additionally provided with a storage section 181.

The storage section 181 stores the system code of each application and the identification number of each secure element 62, which are included in the response from the secure element 62.

Time-Slot Setting Process at the Time of Activation

Figure 12:
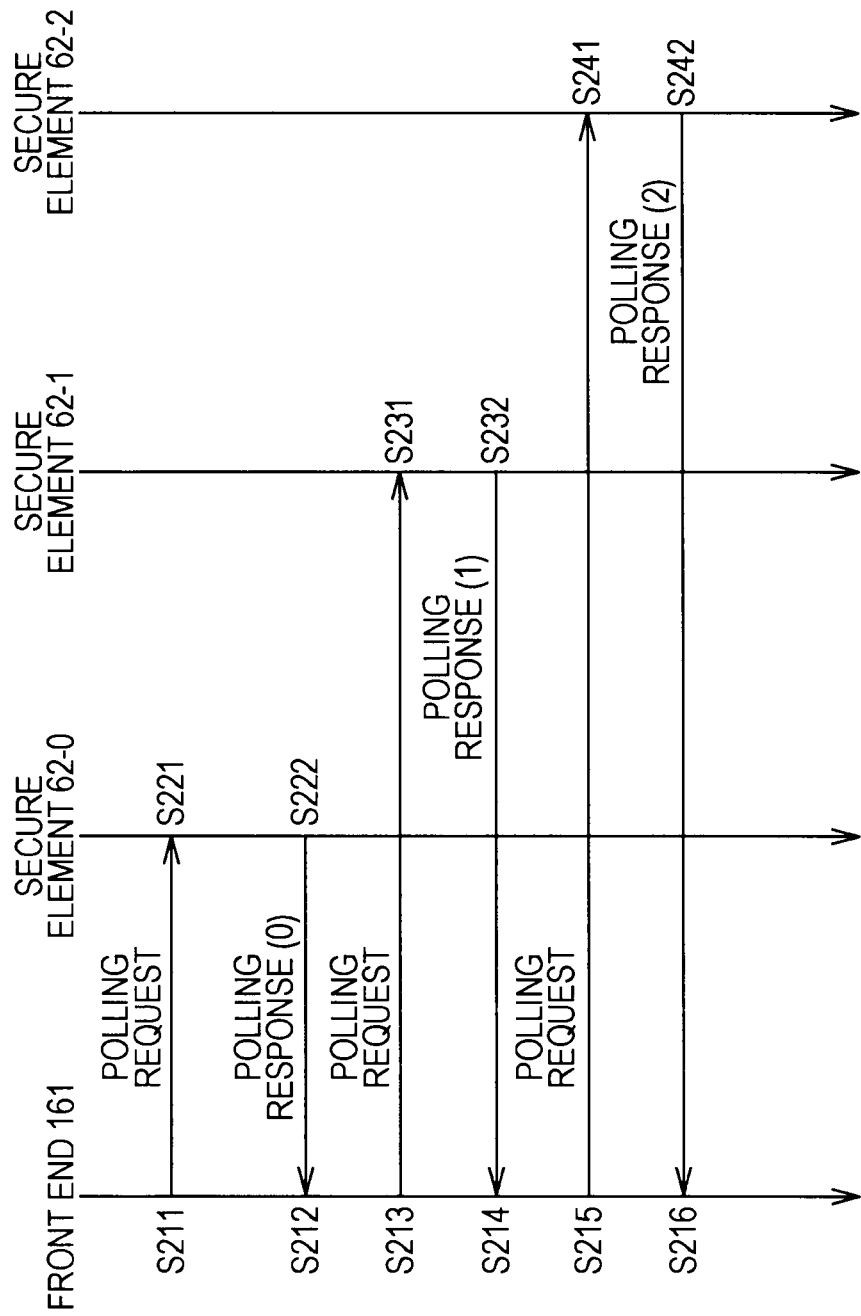
FIG. 12 is a diagram for explaining a polling process performed within an NFC device at the time of activation.

Next, a time-slot setting process performed at the time of activation of the NFC device 51 in FIG. 10 will be described with reference to FIG. 12.

Supposedly, the secure element 62-0 is installed in the NFC device 51 in advance at the time of manufacture thereof, whereas the secure elements 62-1 and 62-2 are sequentially installed (in that order) in the NFC device 51 by the administrator of the NFC device 51. Specifically, at first, only the secure element 62-0 is installed in the NFC device 51, and eventually, the secure elements 62-0, 62-1, and 62-2 are installed in (electrically connected to) the NFC device 51 in that order.

In step S211, the sender section 81 of the front end 161 sends a polling request message to the already-installed secure element 62-0. In this case, the communication partner's system code is set as FFFFh, and the time-slot number is set to a maximum settable number Nmax.

In step S221, when the receiver section 101 of the secure element 62-0 receives this request, the sender section 102 responds in step S222 with a polling response message including its own identification number ID0 at a timing corresponding to a random time-slot number.

In step S212, when the receiver section 82 of the front end 161 receives this response message, the storage section 181 obtains and stores the identification number ID0 of the secure element 62-0 included in the polling response message received by the receiver section 82. In this case, the message processing section 83 sets a time-slot number "0", which is the minimum value, and the storage section 181 stores this time-slot number "0" in correspondence with the identification number ID0.

When the secure element 62-1 is additionally installed in the NFC device 51 from this state, the sender section 81 of the front end 161 sends a polling request message to the already-installed secure element 62-0 and the newly-installed secure element 62-1 in step S213. In this case, the communication partner's system code is set as FFFFh, and the time-slot number is set to a maximum settable number Nmax.

In step S231, when the receiver section 101 of the secure element 62-1 receives this request, the sender section 102 responds in step S232 with a polling response message given its own identification number ID1 by the message processing section 103 at a timing corresponding to a random time-slot number.

In step S214, when the receiver section 82 of the front end 161 receives this response message, the storage section 181 obtains and stores the identification number ID1 of the secure element 62-1 included in the polling response message received by the receiver section 82. In this case, the message processing section 83 sets a time-slot number "1", which corresponds to the second-earliest timing after the minimum value "0", and the storage section 181 stores this time-slot number "1" in correspondence with the identification number ID1. At this time, although a polling response message is also sent from the secure element 62-0 at a timing corresponding to a random time-slot number, the description thereof will be omitted here.

Furthermore, when the secure element 62-2 is additionally installed in the NFC device 51 from this state, the sender section 81 of the front end 161 sends a polling request message to the already-installed secure elements 62-0 and 62-1 and the newly-installed secure element 62-2 in step S215. In this case, the communication partner's system code is set as FFFFh, and the time-slot number is set to a maximum settable number Nmax.

In step S241, when the receiver section 101 of the secure element 62-2 receives this request, the sender section 102 responds in step S242 with a polling response message given its own identification number ID2 by the message processing section 103 at a timing corresponding to a random time-slot number.

In step S216, when the receiver section 82 of the front end 161 receives this response message, the storage section 181 obtains and stores the identification number ID2 of the secure element 62-2 included in the polling response message received by the receiver section 82. In this case, the message processing section 83 sets a time-slot number "2" and the storage section 181 stores this time-slot number "2" in correspondence with the identification number ID2. At this time, although a polling response message is also sent from each of the secure elements 62-0 and 62-1 at a timing corresponding to a random time-slot number, the description thereof will be omitted here.

Accordingly, the front end 161 obtains the identification numbers of the secure elements 62 in the order in which the connection of the secure elements 62 is detected, and sets the time slots of the timings in accordance with the aforementioned order and stores these time slots in correspondence with the identification numbers.

With the above-described process, at the time of activation (i.e., when the secure elements 62 are added), the front end 161 simply performs polling on the secure elements 62 in the order in which the connection of the secure elements 62 is detected, and sets the time slots of the timings in accordance with the aforementioned order, whereby communication can be established in a shorter time at the time of activation of the NFC device 51.

Figure 13:
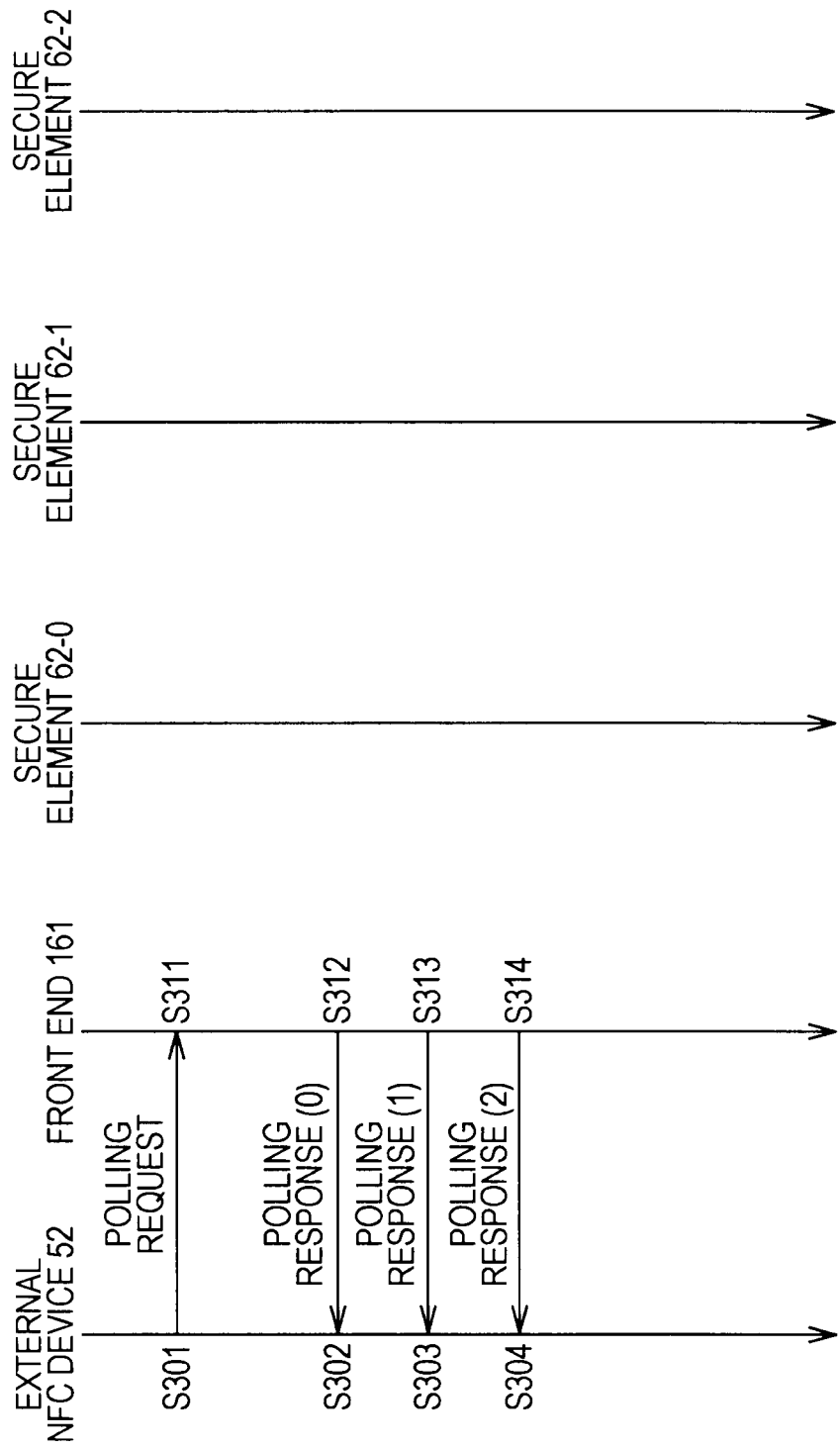
FIG. 13 is a diagram for explaining a process performed when the external NFC device performs polling.

Furthermore, in the above-described process, since the time-slot numbers are set so as not to coincide with each other, a collision does not occur. Following the process in FIG. 12, a process to be performed when the external NFC device 52 performs polling is, for example, as shown in FIG. 13.

Process Performed when External NFC Device Performs Polling

In step S301, the external NFC device 52 outputs a polling request message to the NFC device 51. In this case, the communication partner's system code is set as FFFFh, and the time-slot number is set to a maximum settable number Nmax.

In step S311, when the receiver section 82 of the front end 161 of the NFC device 51 receives this request message, the sender section 81 responds to this request message at a timing corresponding to the set and stored time-slot number.

Specifically, in step S312, the sender section 81 of the front end 161 responds with a polling response message given, by the message processing section 83, the identification number ID0 stored in the storage section 181 in correspondence with the time-slot number "0", which is the earliest timing. In step S302, the external NFC device 52 receives this response message. Thus, the external NFC device 52 can confirm the identification number of the secure element 62-0 that corresponds to the time-slot number "0", which is the earliest timing.

Next, in step S313, the sender section 81 of the front end 161 responds with a polling response message given, by the message processing section 83, the identification number ID1 stored in the storage section 181 in correspondence with the time-slot number "1", which is the second-earliest timing. In step S303, the external NFC device 52 receives this response message. Thus, the external NFC device 52 can confirm the identification number of the secure element 62-1 that corresponds to the time-slot number "1", which is the second-earliest timing.

In step S314, the sender section 81 of the front end 161 responds with a polling response message given, by the message processing section 83, the identification number ID2 stored in the storage section 181 in correspondence with the time-slot number "2", which is the third-earliest timing. In step S304, the external NFC device 52 receives this response message. Thus, the external NFC device 52 can confirm the identification number of the secure element 62-2 that corresponds to the time-slot number "2", which is the third-earliest timing.

Accordingly, since the time-slot numbers are set so as not to coincide with each other, a collision does not occur even when the time given to the time slot of each number is short, thereby allowing for speedy communication.

In near-field communication, a time slot (transmission timing) of a polling response message is set in compliance with standards, such as JIS (Japanese Industrial Standards) X 6319-4 and ISO/IEC (International Organization for Standardization/International Electrotechnical Commission) 18092, such that the time width thereof is 1.208 msec (256× 64/13.56 MHz). This is a short period of time if the near-field communication is to be controlled using software.

In light of this, as mentioned above, the front end 161 stores the polling response messages (i.e., the identification numbers corresponding to the time-slot numbers) from the secure elements 62 in advance so that, in the NFC device 51, only the front end 161 responds with a polling response message to the polling request message from the external NFC device 52. Therefore, the necessity to take into account the transmission time in the communication path between each secure element 62 and the front end 161 can be eliminated, thereby reducing the load of installation that takes into account the transmission timing with regard to each of the secure elements 62.

In the above-described process (i.e., the process shown in FIG. 12), the front end 161 is configured to store the polling response messages (i.e., the identification numbers corresponding to the time-slot numbers) from the secure elements 62 in advance. Alternatively, the front end 161 may send the polling request message from the external NFC device 52 to the secure elements 62 and receive and store the polling response messages from the secure elements 62 until a predetermined timing (between step S311 to step S312 in FIG. 12) before sending the polling response messages to the external NFC device 52. In this case, although the polling response message from each secure element 62 is sent to the front end 161 in a random time slot, since the front end 161 and the secure elements 62 are star-connected to each other, a collision between the polling response messages from the secure elements 62 does not occur.

In the above description, when the external NFC device 52 performs polling, the time-slot number for the polling request message output from the external NFC device 52 is set to a maximum settable number Nmax.

For example, if the time-slot number for the polling request message is "0", the NFC device 51 can only respond with a single polling response message (i.e., a polling response message corresponding to the time-slot number "0" which is the earliest timing). Therefore, the external NFC device 52 can only confirm the identification number of one of the secure elements 62 that corresponds to the response (e.g., the secure element 62-0 corresponding to the time-slot number "0").

Specifically, if the time-slot number for the polling request message sent from the external NFC device 52 is smaller than the number of secure elements 62 accommodated in the NFC device 51, the external NFC device 52 may be incapable of detecting all of the secure elements 62 accommodated in the NFC device 51.

In light of this, as will be described below, the NFC device 51 sequentially changes the time slots given to the respective secure elements 62 so that the external NFC device 52 can detect all of the secure elements 62 accommodated in the NFC device 51 even when the time-slot number for the polling request message sent from the external NFC device 52 is smaller than the number of secure elements 62 accommodated in the NFC device 51.

Process of Sequentially Changing the Time Slots when the External NFC Device Performs Polling A process in which the NFC device 51 sequentially changes the time slots given to the respective secure elements 62 when the external NFC device 52 performs polling will now be described with reference to FIG. 14.

In step S321, the external NFC device 52 outputs a polling request message to the NFC device 51. In this case, the communication partner's system code is set as FFFFh, and the time-slot number is set to "3".

In step S351, when the receiver section 82 of the front end 161 of the NFC device 51 receives this request message, the sender section 81 responds to this request message at a timing corresponding to the set and stored time-slot number.

Figure 14:
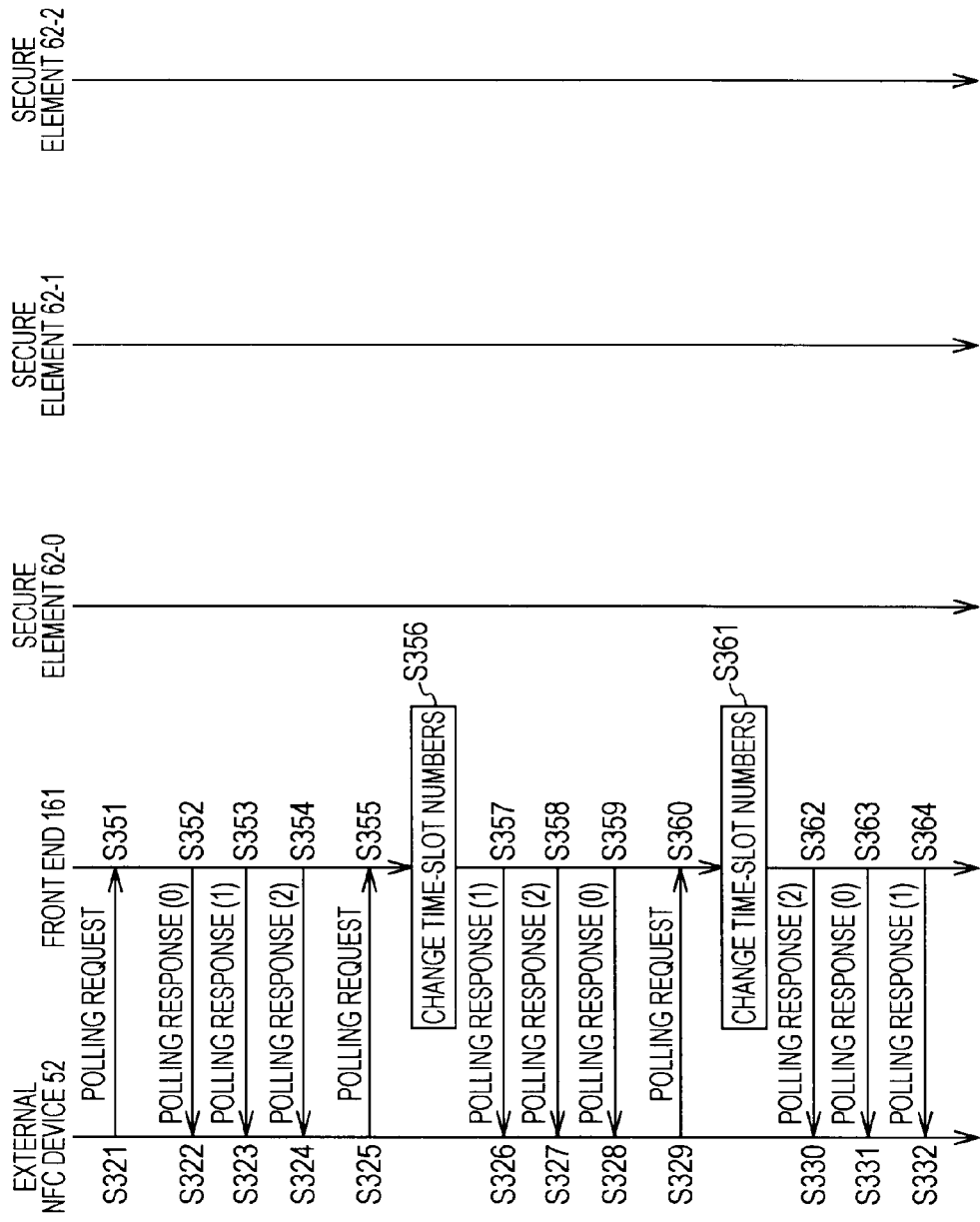
FIG. 14 is a diagram for explaining a process performed when the external NFC device performs polling.

Since steps S322 to S324 and steps S352 to S354 in FIG. 14 are the same as steps S302 to S304 and steps S312 to S314 in FIG. 13, respectively, descriptions thereof will not be repeated.

In step S325, the external NFC device 52 outputs a polling request message to the NFC device 51. In this case, the communication partner's system code is set as FFFFh, and the time-slot number is set to "3".

In step S355, when the receiver section 82 of the front end 161 of the NFC device 51 receives this request message, the message processing section 83 changes the correspondence relationship (combination) between the time-slot numbers and the identification numbers, and the sender section 81 responds to this request message at a timing corresponding to a time-slot number whose correspondence relationship with the identification number has been changed.

Specifically, in step S356, the message processing section 83 of the front end 161 changes the correspondence relationship between the time-slot numbers and the identification numbers stored in the storage section 181 and re-stores the time-slot numbers and the identification numbers in the storage section 181. More specifically, the message processing section 83 changes the identification number ID0 corresponding to the time-slot number "0", which is the earliest timing, to the identification number ID1, changes the identification number ID1 corresponding to the time-slot number "1", which is the second-earliest timing, to the identification number ID2, and changes the identification number ID2 corresponding to the time-slot number "2", which is the third-earliest timing, to the identification number ID0.

In step S357, the sender section 81 of the front end 161 responds with a polling response message that includes the identification number ID1 whose correspondence relationship has been changed to the time-slot number "0", which is the earliest timing, by the message processing section 83. In step S326, the external NFC device 52 receives this response message. Thus, the external NFC device 52 can confirm the identification number of the secure element 62-1 that corresponds to the time-slot number "0", which is the earliest timing.

Next, in step S358, the sender section 81 of the front end 161 responds with a polling response message that includes the identification number ID2 whose correspondence relationship has been changed to the time-slot number "1", which is the second-earliest timing, by the message processing section 83. In step S327, the external NFC device 52 receives this response message. Thus, the external NFC device 52 can confirm the identification number of the secure element 62-2 that corresponds to the time-slot number "1", which is the second-earliest timing.

In step S359, the sender section 81 of the front end 161 responds with a polling response message that includes the identification number ID0 whose correspondence relationship has been changed to the time-slot number "2", which is the third-earliest timing, by the message processing section 83. In step S328, the external NFC device 52 receives this response message. Thus, the external NFC device 52 can confirm the identification number of the secure element 62-0 that corresponds to the time-slot number "2", which is the third-earliest timing.

In step S329, the external NFC device 52 outputs a polling request message to the NFC device 51. In this case, the communication partner's system code is set as FFFFh, and the time-slot number is set to "3".

In step S360, when the receiver section 82 of the front end 161 of the NFC device 51 receives this request message again, the message processing section 83 changes the correspondence relationship (combination) between the time-slot numbers and the identification numbers, and the sender section 81 responds to this request message at a timing corresponding to a time-slot number whose correspondence relationship with the identification number has been changed.

Specifically, in step S361, the message processing section 83 of the front end 161 changes the correspondence relationship between the time-slot numbers and the identification numbers stored in the storage section 181 and re-stores the time-slot numbers and the identification numbers in the storage section 181. More specifically, the message processing section 83 changes the identification number ID1 corresponding to the time-slot number "0", which is the earliest timing, to the identification number ID2, changes the identification number ID2 corresponding to the time-slot number "1", which is the second-earliest timing, to the identification number ID0, and changes the identification number ID0 corresponding to the time-slot number "2", which is the third-earliest timing, to the identification number ID1.

In step S362, the sender section 81 of the front end 161 responds with a polling response message that includes the identification number ID2 whose correspondence relationship has been changed to the time-slot number "0", which is the earliest timing, by the message processing section 83. In step S330, the external NFC device 52 receives this response message. Thus, the external NFC device 52 can confirm the identification number of the secure element 62-2 that corresponds to the time-slot number "0", which is the earliest timing.

Next, in step S363, the sender section 81 of the front end 161 responds with a polling response message that includes the identification number ID0 whose correspondence relationship has been changed to the time-slot number "1", which is the second-earliest timing, by the message processing section 83. In step S331, the external NFC device 52 receives this response message. Thus, the external NFC device 52 can confirm the identification number of the secure element 62-0 that corresponds to the time-slot number "1", which is the second-earliest timing.

In step S364, the sender section 81 of the front end 161 responds with a polling response message that includes the identification number ID1 whose correspondence relationship has been changed to the time-slot number "2", which is the third-earliest timing, by the message processing section 83. In step S332, the external NFC device 52 receives this response message. Thus, the external NFC device 52 can confirm the identification number of the secure element 62-1 that corresponds to the time-slot number "2", which is the third-earliest timing.

Furthermore, if a polling request message is output from the external NFC device 52 to the NFC device 51 after step S332, the front end 161 sends polling response messages corresponding to the respective secure elements 62 with the same time-slot numbers as those in steps S352 to S354. In other words, the process in FIG. 14 is repeated every time a polling request message is output.

Accordingly, the front end 161 repeatedly changes (rotates) the correspondence relationship between the time-slot numbers and the identification numbers every time a polling request message is received from the external NFC device 52. In the process in FIG. 14, since the time-slot number written in the time slot for the polling request message from the external NFC device 52 is "3", the NFC device 51 can respond with a maximum of four polling response messages. Therefore, the external NFC device 52 can detect all of the secure elements 62-0, 62-1, and 62-2 accommodated in the NFC device 51.

Figure 15:
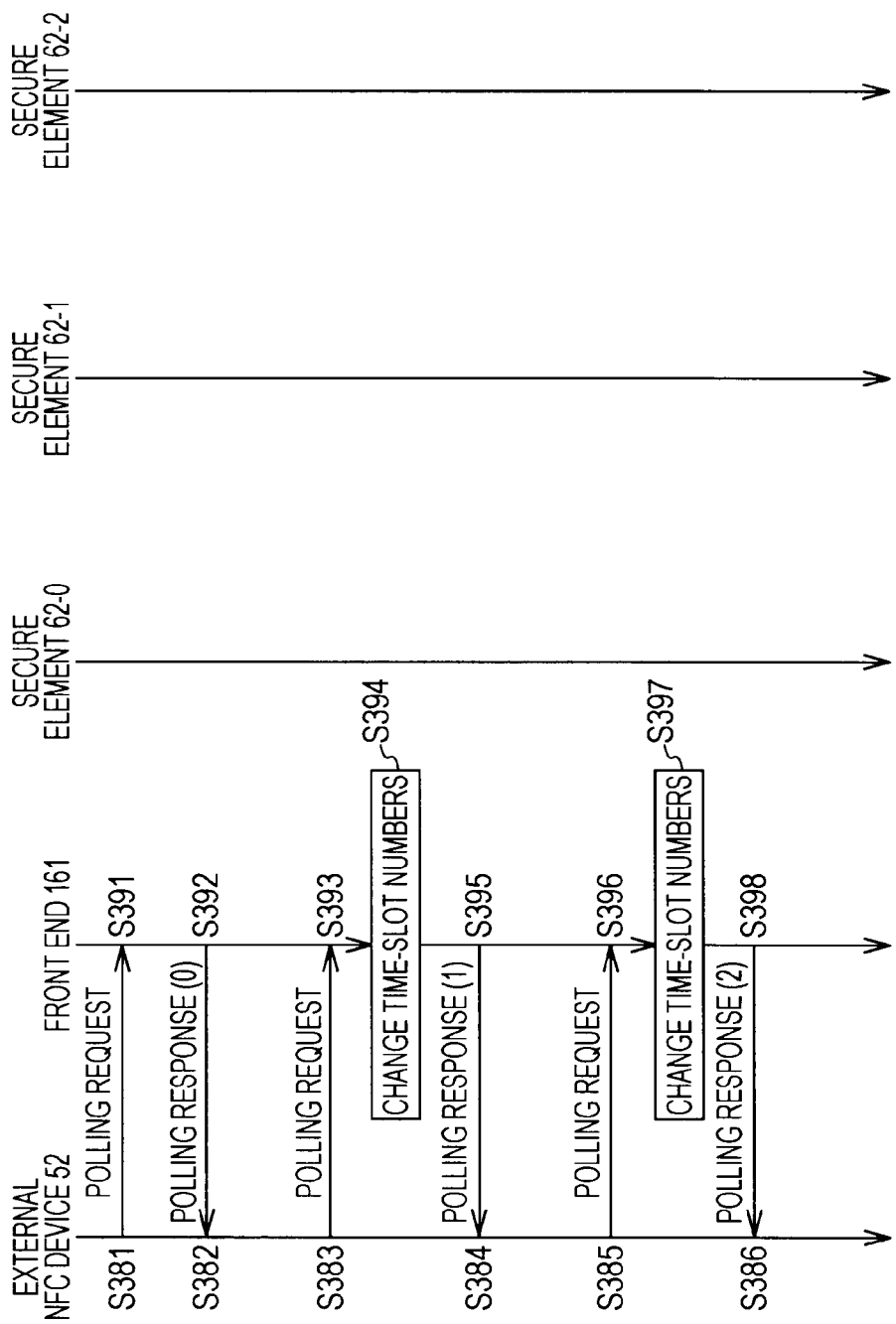
FIG. 15 is a diagram for explaining a process performed when the external NFC device performs polling.

Although the time-slot number written in the time slot for the polling request message from the external NFC device 52 is "3" in the above description, the following description will be directed to a case where the time-slot number written in the time slot for the polling request message is "0" (i.e., in a case where the external NFC device 52 requests only a single polling response message) with reference to FIG. 15.

In step S381, the external NFC device 52 outputs a polling request message to the NFC device 51. In this case, the communication partner's system code is set as FFFFh, and the time-slot number is set to "0".

In step S391, when the receiver section 82 of the front end 161 of the NFC device 51 receives this request message, the sender section 81 responds to this request message at a timing corresponding to the set and stored time-slot number.

Specifically, in step S392, the sender section 81 of the front end 161 responds with a polling response message given, by the message processing section 83, the identification number ID0 stored in the storage section 181 in correspondence with the time-slot number "0", which is the earliest timing. In step S382, the external NFC device 52 receives this response message. Thus, the external NFC device 52 can confirm the identification number of the secure element 62-0 that corresponds to the time-slot number "0", which is the earliest timing.

It should be noted that, since the time slot for the polling request message from the external NFC device 52 is "0", the front end 161 does not send any more polling response messages. Specifically, a polling response message including the identification number ID1 corresponding to the time-slot number "1", which is the second-earliest timing, and a polling response message including the identification number ID2 corresponding to the time-slot number "2", which is the third-earliest timing, are not sent to the external NFC device 52.

In step S383, the external NFC device 52 outputs a polling request message to the NFC device 51. In this case, the communication partner's system code is set as FFFFh, and the time-slot number is set to "0".

In step S393, when the receiver section 82 of the front end 161 of the NFC device 51 receives this request message again, the message processing section 83 changes the correspondence relationship (combination) between the time-slot numbers and the identification numbers, and the sender section 81 responds to this request message at a timing corresponding to a time-slot number whose correspondence relationship with the identification number has been changed.

Specifically, in step S394, the message processing section 83 of the front end 161 changes the correspondence relationship between the time-slot numbers and the identification numbers stored in the storage section 181 and re-stores the time-slot numbers and the identification numbers in the storage section 181. More specifically, the message processing section 83 changes the identification number ID0 corresponding to the time-slot number "0", which is the earliest timing, to the identification number ID1, changes the identification number ID1 corresponding to the time-slot number "1", which is the second-earliest timing, to the identification number ID2, and changes the identification number ID2 corresponding to the time-slot number "2", which is the third-earliest timing, to the identification number ID0.

In step S395, the sender section 81 of the front end 161 responds with a polling response message that includes the identification number ID1 whose correspondence relationship has been changed to the time-slot number "0", which is the earliest timing, by the message processing section 83. In step S384, the external NFC device 52 receives this response message. Thus, the external NFC device 52 can confirm the identification number of the secure element 62-1 that corresponds to the time-slot number "0", which is the earliest timing.

It should be noted that, since the time slot of the polling request message from the external NFC device 52 is "0", the front end 161 does not send any more polling response messages. Specifically, a polling response message including the identification number ID2 corresponding to the time-slot number "1", which is the second-earliest timing, and a polling response message including the identification number ID0 corresponding to the time-slot number "2", which is the third-earliest timing, are not sent to the external NFC device 52.

In step S385, the external NFC device 52 outputs a polling request message to the NFC device 51. In this case, the communication partner's system code is set as FFFFh, and the time-slot number is set to "0".

In step S396, when the receiver section 82 of the front end 161 of the NFC device 51 receives this request message again, the message processing section 83 changes the correspondence relationship (combination) between the time-slot numbers and the identification numbers, and the sender section 81 responds to this request message at a timing corresponding to a time-slot number whose correspondence relationship with the identification number has been changed.

Specifically, in step S397, the message processing section 83 of the front end 161 changes the correspondence relationship between the time-slot numbers and the identification numbers stored in the storage section 181 and re-stores the time-slot numbers and the identification numbers in the storage section 181. More specifically, the message processing section 83 changes the identification number ID1 corresponding to the time-slot number "0", which is the earliest timing, to the identification number ID2, changes the identification number ID2 corresponding to the time-slot number "1", which is the second-earliest timing, to the identification number ID0, and changes the identification number ID0 corresponding to the time-slot number "2", which is the third-earliest timing, to the identification number ID1.

In step S398, the sender section 81 of the front end 161 responds with a polling response message that includes the identification number ID2 whose correspondence relationship has been changed to the time-slot number "0", which is the earliest timing, by the message processing section 83. In step S386, the external NFC device 52 receives this response message. Thus, the external NFC device 52 can confirm the identification number of the secure element 62-2 that corresponds to the time-slot number "0", which is the earliest timing.

It should be noted that, since the time slot of the polling request message from the external NFC device 52 is "0", the front end 161 does not send any more polling response messages. Specifically, a polling response message including the identification number ID0 corresponding to the time-slot number "1", which is the second-earliest timing, and a polling response message including the identification number ID1 corresponding to the time-slot number "2", which is the third-earliest timing, are not sent to the external NFC device 52.

Accordingly, since the front end 161 repeatedly changes (rotates) the correspondence relationship between the time-slot numbers and the identification numbers every time a polling request message is received from the external NFC device 52, the external NFC device 52 can detect all of the secure elements 62-0, 62-1, and 62-2 accommodated in the NFC device 51 even when the time-slot number written in the time slot for the polling request message from the external NFC device 52 is "0".

Accordingly, even when the time-slot number for the polling request message sent from the external NFC device 52 is smaller than the number of secure elements 62 accommodated in the NFC device 51, the NFC device 51 sequentially changes the time slots given to the respective secure elements 62 so that the external NFC device 52 can detect all of the secure elements 62 accommodated in the NFC device 51.

Although the front end 161 is configured to store the identification numbers of the respective secure elements 62 and set (and change) the time slots in the above description, the front end 161 may alternatively be configured to store the identification numbers of only some of the secure elements 62 and set the time slots thereof.

Time-Slot Setting Process at the Time of Activation

Figure 16:
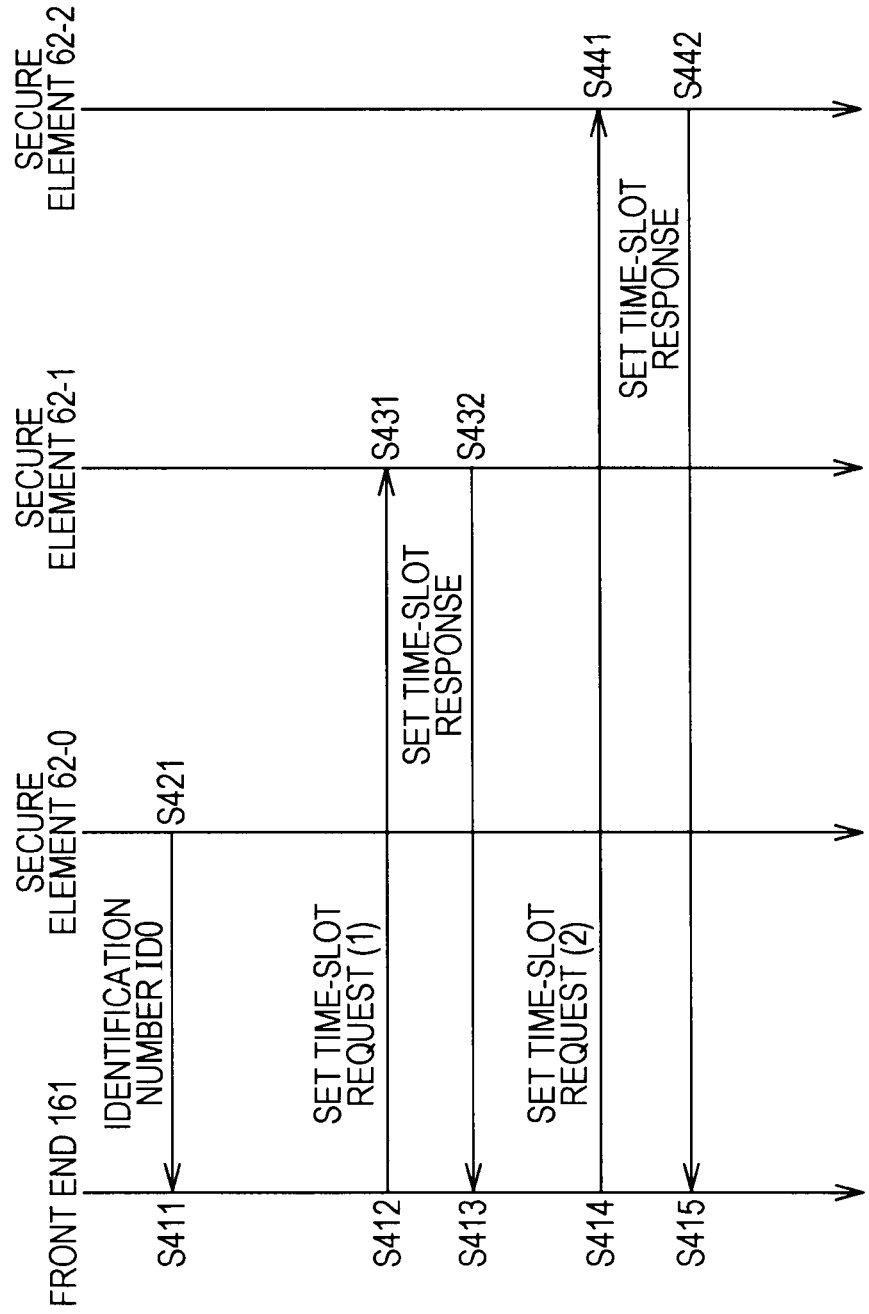
FIG. 16 is a diagram for explaining a time-slot setting process performed at the time of activation.

Referring to FIG. 16, the following description is directed to a time-slot setting process performed at the time of activation of the NFC device 51 that is configured to store the identification numbers of only some of the secure elements 62 and set the time slots thereof.

Supposedly, the secure element 62-0 is installed in the NFC device 51 in advance at the time of manufacture thereof, whereas the secure elements 62-1 and 62-2 are sequentially installed (in that order) in the NFC device 51 by the administrator of the NFC device 51.

For example, when manufacturing the NFC device 51, the sender section 102 of the secure element 62-0 informs the front end 161 of its own identification number ID0 in step S421.

In step S411, when the receiver section 82 of the front end 161 receives the identification number ID0 of the secure element 62-0, the storage section 181 stores the identification number ID0 of the secure element 62-0 received by the receiver section 82. In this case, the message processing section 83 sets the time-slot number "0", which is a minimum value, and the storage section 181 stores the time-slot number "0" in correspondence with the identification number ID0.

The following description is directed to a case where the secure elements 62-1 and 62-2 are installed in the NFC device 51 in that order by the administrator of the NFC device 51. Specifically, the secure elements 62-1 and 62-2 are installed in (electrically connected to) the NFC device 51 in that order, and the front end 161 knows the identification numbers of the individual secure elements 62-1 and 62-2, as well as the order in which the connection of the secure elements 62-1 and 62-2 is detected.

In step S412, the sender section 81 of the front end 161 sends a set time-slot request message to the secure element 62-1, the connection of which has been detected first except for the secure element 62-0 and whose identification number is ID1. In this request message, a time-slot number "1" corresponding to the second-earliest timing after the minimum value "0" is set as a time-slot number by the message processing section 83.

In step S431, when the secure element 62-1 whose identification number is ID1 receives this request message via the receiver section 101 thereof, the storage section 104 stores the time-slot number "1" thereof in a volatile manner. As a result, the secure element 62-1 subsequently performs communication at a timing corresponding to the stored time-slot number "1".

In step S432, the sender section 102 of the secure element 62-1 sends a set time-slot response message to the front end 161, which is the original source of the request message. This response message is given "ID1" as the sender's identification number by the message processing section 103, as well as the set and stored time-slot number "1", as the status, for confirmation.

In step S413, the receiver section 82 of the front end 161 receives this response message so as to confirm that the time-slot number is stored in the secure element 62-1.

In step S414, the sender section 81 of the front end 161 sends a set time-slot request message to the secure element 62-2, the connection of which has been detected second except for the secure element 62-0 and whose identification number is ID2. In this request message, a time-slot number "2" is set as a time-slot number by the message processing section 83.

In step S441, when the secure element 62-2 whose identification number is ID2 receives this request message via the receiver section 101 thereof, the storage section 104 stores the time-slot number "2" thereof in a volatile manner. As a result, the secure element 62-2 subsequently performs communication at a timing corresponding to the stored time-slot number "2".

In step S442, the sender section 102 of the secure element 62-2 sends a set time-slot response message to the front end 161, which is the original source of the request message. This response message is given "ID2" as the sender's identification number by the message processing section 103, as well as the set and stored time-slot number "2", as the status, for confirmation.

In step S415, the receiver section 82 of the front end 161 receives this response message so as to confirm that the time-slot number is stored in the secure element 62-2.

In this manner, the front end 161 sets the time slots of the secure elements 62 at the time of activation of the NFC device 51.

With the above-described process, at the time of activation, the front end 161 simply sets the time slots of the timings in accordance with the order in which the connection of the secure elements 62 is detected, whereby communication can be established in a shorter time at the time of activation of the NFC device 51.

Figure 17:
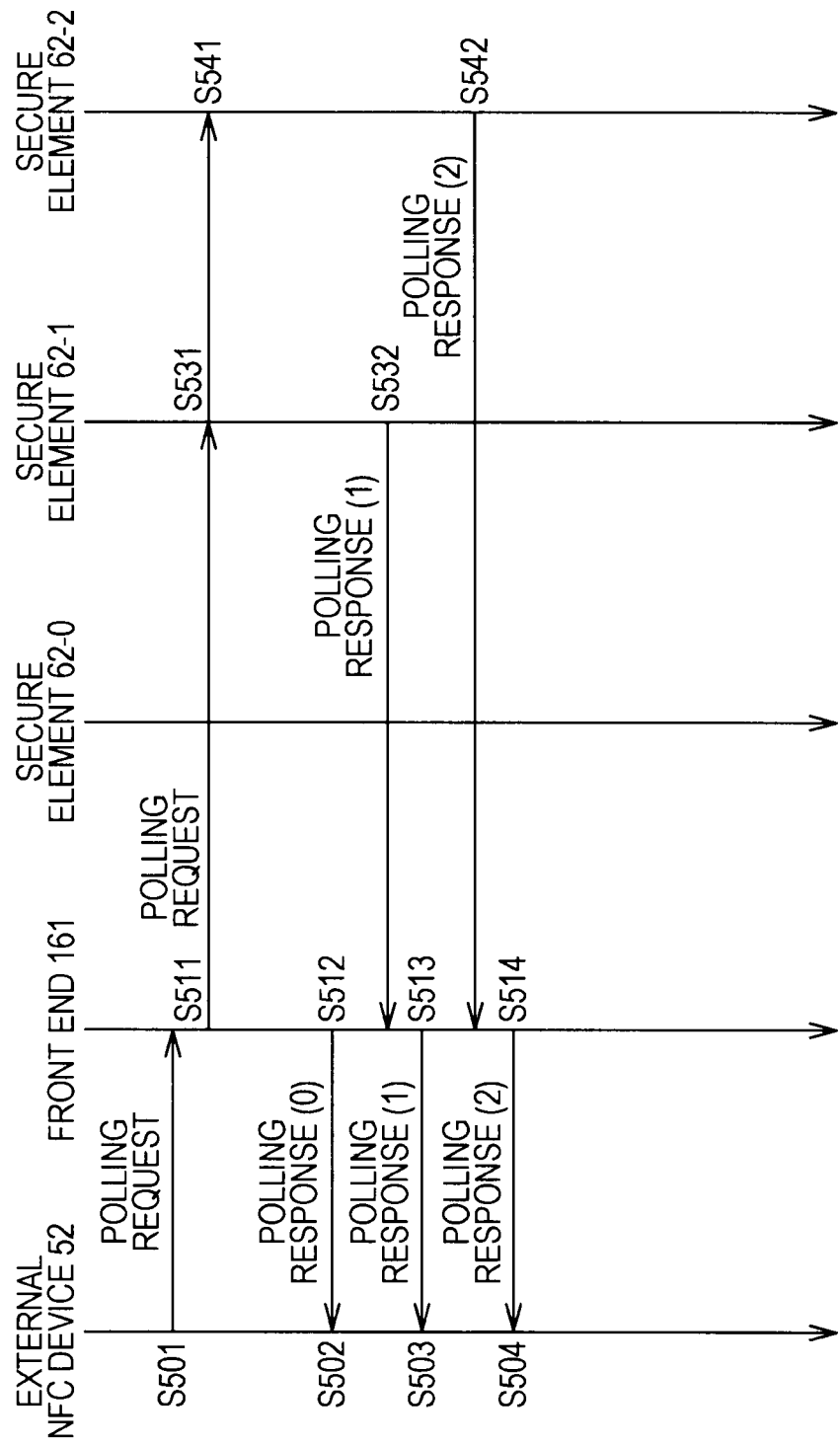
FIG. 17 is a diagram for explaining a process performed when the external NFC device performs polling.

Furthermore, in the above-described process, since the time-slot numbers are set so as not to coincide with each other, a collision does not occur. Following the process in FIG. 16, a process to be performed when the external NFC device 52 performs polling is, for example, as shown in FIG. 17.

Process Performed when External NFC Device Performs Polling

In step S501, the external NFC device 52 outputs a polling request message to the NFC device 51. In this case, each communication partner's system code is set as FFFFh, and the time-slot number is set to a maximum settable number Nmax.

In step S511, when the receiver section 82 of the front end 161 of the NFC device 51 receives this request message, the message processing section 83 changes the communication partners' system codes to SC1 and SC2, and the sender section 81 supplies the system codes SC1 and SC2 to the secure elements 62-1 and 62-2. The receiver sections 101 of secure elements 62-1 and 62-2 receive this request message in steps S531 and S541, respectively.

When the front end 161 and the secure elements 62-1 and 62-2 receive this request message, the front end 161 and the secure elements 62-1 and 62-2 each respond at a timing corresponding to the time-slot number set for this request message.

Specifically, in step S512, the sender section 81 of the front end 161 responds with a polling response message given, by the message processing section 83, the identification number ID0 stored in the storage section 181 in correspondence with the time-slot number "0", which is the earliest timing. In step S502, the external NFC device 52 receives this response message. Thus, the external NFC device 52 can confirm the identification number of the secure element 62-0 that corresponds to the time-slot number "0", which is the earliest timing.

Next, in step S532, the sender section 102 of the secure element 62-1 in which the time-slot number "1" corresponding to the second-earliest timing is set responds with a polling response message given its own identification number ID1 by the message processing section 103. In step S513, when the receiver section 82 of the front end 161 receives this response message, the sender section 81 supplies the response message to the external NFC device 52 and each secure element 62. However, the process in which the polling response message is supplied from the front end 161 to each secure element 62 is not shown in FIG. 17.

In step S503, the external NFC device 52 receives this response message. Thus, the external NFC device 52 can confirm the identification number of the secure element 62-1. Although the secure elements 62-0, 62-1, and 62-2 each receive this response message, this will be disregarded since a request message is not output.

In step S542, the sender section 102 of the secure element 62-2 in which the time-slot number "2" corresponding to the latest timing is set responds with a polling response message given its own identification number ID2 by the message processing section 103. In step S514, when the receiver section 82 of the front end 161 receives this response message, the sender section 81 supplies the response message to the external NFC device 52 and each secure element 62. However, the process in which the polling response message is supplied from the front end 161 to each secure element 62 is not shown in FIG. 17.

In step S504, the external NFC device 52 receives this response message. Thus, the external NFC device 52 can confirm the identification number of the secure element 62-2. Although the secure elements 62-0, 62-1, and 62-2 each receive this response message, this will be disregarded since a request message is not output.

Accordingly, since the time-slot numbers are set so as not to coincide with each other, a collision does not occur even when the time given to the time slot of each number is short, thereby allowing for speedy communication.

Although the time slot of the secure element 62-0 is set by the front end 161 in the above description, the aforementioned time slot may alternatively be set in advance, such as when manufacturing the NFC device 51.

Time-Slot Setting Process at the Time of Activation

Figure 18:
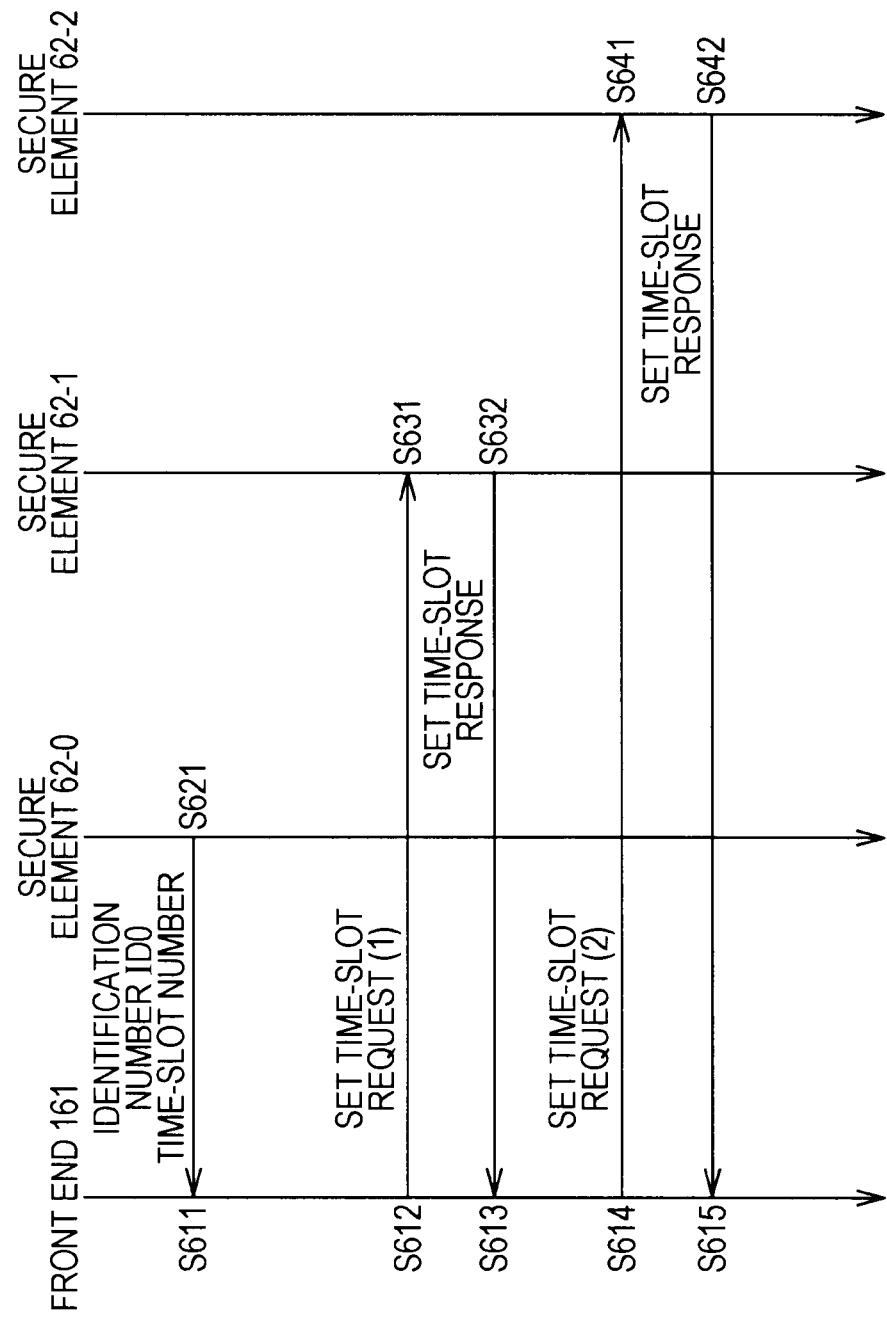
FIG. 18 is a diagram for explaining a time-slot setting process performed at the time of activation.

Referring to FIG. 18, the following description is directed to a time-slot setting process performed at the time of activation of the NFC device 51 in which the time slots of some of the secure elements 62 are set in advance.

Supposedly, the secure element 62-0 is installed in the NFC device 51 in advance at the time of manufacture thereof, whereas the secure elements 62-1 and 62-2 are sequentially installed (in that order) in the NFC device 51 by the administrator of the NFC device 51. Furthermore, when installing the secure element 62-0 into the NFC device 51 during manufacture thereof, the time-slot number "2" is set (stored) in the storage section 104 thereof.

For example, when manufacturing the NFC device 51, the sender section 102 of the secure element 62-0 informs the front end 161 of its own identification number ID0 and the time-slot number "2" in step S621.

In step S611, when the receiver section 82 of the front end 161 receives the time-slot number "2" and the identification number ID0 of the secure element 62-0, the storage section 181 stores the identification number ID0 and the time-slot number "2" received by the receiver section 82.

The following description is directed to a case where the secure elements 62-1 and 62-2 are installed in the NFC device 51 in that order by the administrator of the NFC device 51. Specifically, the secure elements 62-1 and 62-2 are installed in (electrically connected to) the NFC device 51 in that order, and the front end 161 knows the identification numbers of the individual secure elements 62-1 and 62-2, as well as the order in which the connection of the secure elements 62-1 and 62-2 is detected.

In step S612, the sender section 81 of the front end 161 sends a set time-slot request message to the secure element 62-1, the connection of which has been detected first except for the secure element 62-0 and whose identification number is ID1. In this request message, the minimum value of "0" is set as a time-slot number by the message processing section 83.

In step S631, when the secure element 62-1 whose identification number is ID1 receives this request message via the receiver section 101 thereof, the storage section 104 stores the time-slot number "0" thereof in a volatile manner. As a result, the secure element 62-1 subsequently performs communication at a timing corresponding to the stored time-slot number "0". Since this time-slot number "0" is a value indicating the earliest timing, the secure element 62-1 can perform communication by priority in terms of time, relative to the other secure elements 62.

In step S632, the sender section 102 of the secure element 62-1 sends a set time-slot response message to the front end 161, which is the original source of the request message. This response message is given "ID1" as the sender's identification number by the message processing section 103, as well as the set and stored time-slot number "0", as the status, for confirmation.

In step S613, the receiver section 82 of the front end 161 receives this response message so as to confirm that the time-slot number is stored in the secure element 62-1.

In step S614, the sender section 81 of the front end 161 sends a set time-slot request message to the secure element 62-2, the connection of which has been detected second except for the secure element 62-0 and whose identification number is ID2. In this request message, a time-slot number "1" corresponding to the second-earliest timing after the minimum value "0" is set as a time-slot number by the message processing section 83.

In step S641, when the secure element 62-2 whose identification number is ID2 receives this request message via the receiver section 101 thereof, the storage section 104 stores the time-slot number "1" thereof in a volatile manner. As a result, the secure element 62-2 subsequently performs communication at a timing corresponding to the stored time-slot number "1".

In step S642, the sender section 102 of the secure element 62-2 sends a set time-slot response message to the front end 161, which is the original source of the request message. This response message is given "ID2" as the sender's identification number by the message processing section 103, as well as the set and stored time-slot number "1", as the status, for confirmation.

In step S615, the receiver section 82 of the front end 161 receives this response message so as to confirm that the time-slot number is stored in the secure element 62-2.

In this manner, the front end 161 sets the time slots of the secure elements 62 at the time of activation of the NFC device 51.

With the above-described process, at the time of activation, the front end 161 simply sets the time slots of the timings in accordance with the order in which the connection of the secure elements 62 is detected, whereby communication can be established in a shorter time at the time of activation of the NFC device 51.

Figure 19:
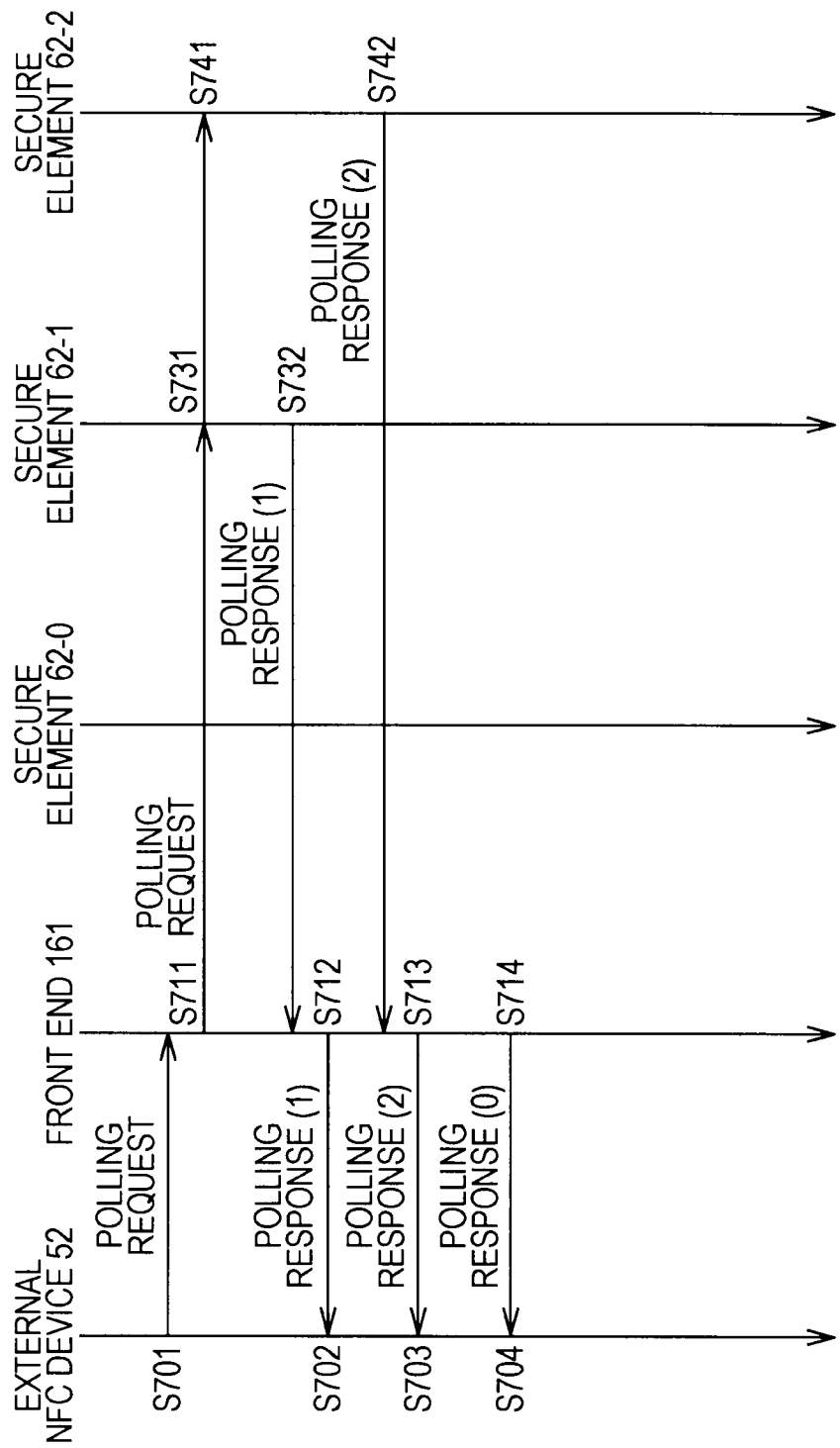
FIG. 19 is a diagram for explaining a process performed when the external NFC device performs polling.

Furthermore, in the above-described process, since the time-slot numbers are set so as not to coincide with each other, a collision does not occur. Following the process in FIG. 18, a process to be performed when the external NFC device 52 performs polling is, for example, as shown in FIG. 19.

Process Performed when External NFC Device Performs Polling

In step S701, the external NFC device 52 outputs a polling request message to the NFC device 51. In this case, each communication partner's system code is set as FFFFh, and the time-slot number is set to a maximum settable number Nmax.

In step S711, when the receiver section 82 of the front end 161 of the NFC device 51 receives this request message, the message processing section 83 changes the communication partners' system codes to SC1 and SC2, and the sender section 81 supplies the system codes SC1 and SC2 to the secure elements 62-1 and 62-2. The receiver sections 101 of secure elements 62-1 and 62-2 receive this request message in steps S731 and S741, respectively.

When the front end 161 and the secure elements 62-1 and 62-2 receive this request message, the front end 161 and the secure elements 62-1 and 62-2 each respond at a timing corresponding to the time-slot number set for this request message.

Specifically, in step S732, the sender section 102 of the secure element 62-1 in which the time-slot number "0" corresponding to the earliest timing is set responds with a polling response message given its own identification number ID1 by the message processing section 103. In step S712, when the receiver section 82 of the front end 161 receives this response message, the sender section 81 supplies the response message to the external NFC device 52 and each secure element 62. However, the process in which the polling response message is supplied from the front end 161 to each secure element 62 is not shown in FIG. 19.

In step S702, the external NFC device 52 receives this response message. Thus, the external NFC device 52 can confirm the identification number of the secure element 62-1. Although the secure elements 62-0, 62-1, and 62-2 each receive this response message, this will be disregarded since a request message is not output.

Next, in step S742, the sender section 102 of the secure element 62-2 in which the time-slot number "1" corresponding to the second-earliest timing is set responds with a polling response message given its own identification number ID2 by the message processing section 103. In step S713, when the receiver section 82 of the front end 161 receives this response message, the sender section 81 supplies the response message to the external NFC device 52 and each secure element 62. However, the process in which the polling response message is supplied from the front end 161 to each secure element 62 is not shown in FIG. 19.

In step S703, the external NFC device 52 receives this response message. Thus, the external NFC device 52 can confirm the identification number of the secure element 62-2. Although the secure elements 62-0, 62-1, and 62-2 each receive this response message, this will be disregarded since a request message is not output.

Furthermore, in step S714, the sender section 81 of the front end 161 responds with a polling response message that includes the time-slot number "2" corresponding to the latest timing and the identification number ID0 stored in the storage section 181. In step S704, the external NFC device 52 receives this response message. Thus, the external NFC device 52 can confirm the identification number of the secure element 62-0 that corresponds to the time-slot number "2", which is the latest timing.

Accordingly, since the time-slot numbers are set so as not to coincide with each other, a collision does not occur even when the time given to the time slot of each number is short, thereby allowing for speedy communication.

Next, a process in which the external NFC device 52 reads data from the NFC device 51 after the communication is established as the result of the above-described process will be described with reference to FIG. 20.

Data Reading Process

In step S801, the external NFC device 52 designates the identification number ID1 of the secure element 62-1, which is one of the communication partners, and sends a read request message. In step S811, when the receiver section 82 of the front end 161 receives this request message, the sender section 81 supplies the request message to each element in the NFC device 51. Although the secure elements 62-0 and 62-2 receive this request message in steps S821 and S841, respectively, this will be disregarded since the identification numbers thereof do not match. In other words, in step S831, the receiver section 101 of the secure element 62-1 receives this request message.

In step S832, the sender section 102 of the secure element 62-1 responds with a read response message given its own identification number ID1 by the message processing section 103. In step S812, when the receiver section 82 of the front end 161 receives this response message, the sender section 81 supplies the response message to the external NFC device 52 and each secure element 62. However, the process in which the read response message is supplied from the front end 161 to each secure element 62 is not shown in FIG. 20.

In step S802, the external NFC device 52 receives this response message. Thus, the external NFC device 52 can subsequently read data from the secure element 62-1. Although the secure elements 62-0, 62-1, and 62-2 each receive this response message, this will be disregarded since a request message is not output.

Next, a process in which the external NFC device 52 writes data into the NFC device 51 after the communication is established will be described with reference to FIG. 21.

Data Writing Process

In step S851, the external NFC device 52 designates the identification number ID2 of the secure element 62-2, which is one of the communication partners, and sends a write request message. In step S861, when the receiver section 82 of the front end 161 receives this request message, the sender section 81 supplies the request message to each element in the NFC device 51. Although the secure elements 62-0 and 62-1 receive this request message in steps S871 and S881, respectively, this will be disregarded since the identification numbers thereof do not match. In step S891, the receiver section 101 of the secure element 62-2 receives this request message.

In step S892, the sender section 102 of the secure element 62-2 responds with a write response message given its own identification number ID2 by the message processing section 103. In step S862, when the receiver section 82 of the front end 161 receives this response message, the sender section 81 supplies the response message to the external NFC device 52 and each secure element 62. However, the process in which the write response message is supplied from the front end 161 to each secure element 62 is not shown in FIG. 21.

In step S852, the external NFC device 52 receives this response message. Thus, the external NFC device 52 can subsequently write data into the secure element 62-2. Although the secure elements 62-0, 62-1, and 62-2 each receive this response message, this will be disregarded since a request message is not output.

The above-described series of steps can be executed by using hardware or by using software. When executing the series of steps using software, a program constituting the software may be installed from a program storage medium into a computer built in dedicated hardware or, for example, a general-purpose personal computer capable of executing various functions by installing various kinds of programs therein.

In this description, the steps that define the program may be performed in a time-series fashion in the written order, or may be performed in a parallel fashion or in an individual fashion instead of in a time-series fashion.

Furthermore, in this description, the term "system" is used to express the entire system that includes a plurality of devices.

The present application contains subject matter related to that disclosed in Japanese Priority Patent Application JP 2009-195899 filed in the Japan Patent Office on Aug. 26, 2009, the entire content of which is hereby incorporated by reference.

Embodiments of the present invention are not to be limited to the above-described embodiments, and various modifications are permissible within the scope of the invention.

What is claimed is:

1. An information processing device comprising:
a plurality of elements that perform processing independently of each other, the plurality of elements including a detachable element and a fixed element; and
a front end that controls the plurality of elements, is shared by the plurality of elements, and performs near-field communication with an external device, wherein the front end gives different time slots for communication to the plurality of elements at the time of activation, the time slots given to the elements by the front end correspond to timings according to the order in which the elements are electrically connected, the fixed element stores the given time slot in a nonvolatile manner, the detachable element stores the time slot in a volatile manner, and
the time of activation includes when power is supplied, when the element is removed, or when the element is added.

2. The information processing device according to claim 1, wherein the time slot given to the fixed element by the front end corresponds to an earliest timing, and wherein the time slot given to the detachable element by the front end corresponds to a timing later than that for the fixed element.

3. The information processing device according to claim 1, wherein the front end sends a polling request to the plurality of elements in the order in which the elements are electrically connected, acquires and stores identification information for identifying each element, the identification information being included in a response to the request from each element, and gives the elements the time slots corresponding to timings according to the order in which the identification information is acquired therefrom.

4. The information processing device according to claim 3, wherein when the front end receives a polling request from the external device towards the plurality of elements, the front end sends a response for each element to the external device in accordance with the time slot given to the element, the response including the stored identification information of the element.

5. The information processing device according to claim 3, wherein every time the front end receives a polling request from the external device towards the plurality of elements, the front end changes the time slot given to each element and sends a response for each element to the external device in accordance with the changed time slot of the element, the response including the stored identification information of the element.

6. The information processing device according to claim 1, wherein the front end stores identification information of the fixed element of the plurality of elements in advance and gives a time slot corresponding to a predetermined timing to the fixed element, and wherein when the front end receives a polling request from the external device towards the plurality of elements, the front end sends a response for the fixed element to the external device in accordance with the time slot corresponding to the predetermined timing, the response including the stored identification information.

7. The information processing device according to claim 6, wherein the time slot of the fixed element is given thereto in advance at the time of manufacture, wherein when the front end receives the polling request from the external device towards the plurality of elements, the front end sends a response for the fixed element to the external device in accordance with the time slot given in advance at the time of manufacture, the response including the stored identification information.

8. The information processing device according to claim 1, wherein the fixed element functions as a controller that controls the other element.

9. A storage medium that stores a program of an information processing device that includes a plurality of elements that perform processing independently of each other, the plurality of elements including a detachable element and a fixed element; and a front end that controls the plurality of elements, is shared by the plurality of elements, and performs near-field communication with an external device, wherein the program makes a computer execute a process comprising:
  giving, with the front end, different time slots for communication to the plurality of elements at the time of activation, wherein the time slots given to the elements by the front end correspond to timings according to the order in which the elements are electrically connected, the fixed element stores the given time slot in a nonvolatile manner, the detachable element stores the time slot in a volatile manner, and
  the time of activation includes when power is supplied, when the element is removed, or when the element is added.

* * * * *